US012748341B2

(12) United States Patent
Tseng et al.

(10) Patent No.: US 12,748,341 B2
(45) Date of Patent: Sep. 29, 2026

(54) IMAGING LENS MODULE AND ELECTRONIC DEVICE

(71) Applicant: LARGAN PRECISION CO., LTD., Taichung City (TW)

(72) Inventors: Te-Sheng Tseng, Taichung City (TW); Yu-Tzu Chang, Taichung City (TW); Hsiu-Yi Hsiao, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 284 days.

(21) Appl. No.: 18/136,771

(22) Filed: Apr. 19, 2023

(65) Prior Publication Data

US 2024/0248373 A1 Jul. 25, 2024

Related U.S. Application Data

(60) Provisional application No. 63/440,057, filed on Jan. 19, 2023.

(51) Int. Cl.
*G03B 9/06* (2021.01)
*G02B 7/02* (2021.01)
(Continued)

(52) U.S. Cl.
CPC ............... *G03B 9/06* (2013.01); *G02B 7/021* (2013.01); *G03B 13/36* (2013.01); *H01F 7/081* (2013.01); *G02B 13/001* (2013.01); *G03B 30/00* (2021.01)

(58) Field of Classification Search
CPC .......... G03B 9/06; G03B 30/00; G03B 13/36; G02B 7/021; G02B 13/001
See application file for complete search history.

(56) References Cited

U.S. PATENT DOCUMENTS 10,969,653 B2 4/2021 Kim et al.
12,019,365 B2 * 6/2024 Tsai ....................... G03B 7/085
(Continued)

FOREIGN PATENT DOCUMENTS

CN 202394021 U 8/2012
CN 110703534 A 1/2020
(Continued)

OTHER PUBLICATIONS

Extended European Search Report dated Jan. 4, 2024 as received in Application No. 23165872.5.

*Primary Examiner* — Christopher E Mahoney
(74) *Attorney, Agent, or Firm* — Maschoff Brennan

(57) ABSTRACT

An imaging lens module includes a lens element having an optical axis, a lens carrier and a variable through hole assembly. The lens carrier accommodates the lens element and sequentially includes an object-side portion, an image-side portion and a tubular portion. The object-side portion configured for light entering the imaging lens module forms a minimum opening of the lens carrier. The variable through hole assembly is disposed on the object-side portion and includes rotatable blades rotatably disposed about the optical axis and configured to form a through hole with a variable size. Moreover, the object-side portion further has a guiding structure guiding the movement of the rotatable blades and located further away from the optical axis than the minimum opening. Moreover, the object-side portion and the image-side portion form an air sleeve therebetween, and the air sleeve is located further away from the optical axis than the tubular portion.

20 Claims, 24 Drawing Sheets

(51) Int. Cl.

| | |
|---|---|
| ***G03B 13/36*** | (2021.01) |
| ***H01F 7/08*** | (2006.01) |
| *G02B 13/00* | (2006.01) |
| *G03B 30/00* | (2021.01) |

(56) References Cited

U.S. PATENT DOCUMENTS

| | | | | |
|---|---|---|---|---|
| 2019/0373145 | A1 | 12/2019 | Yu et al. | |
| 2020/0409028 | A1* | 12/2020 | Tsai | G02B 7/09 |
| 2021/0109305 | A1 | 4/2021 | Hu et al. | |
| 2022/0413361 | A1* | 12/2022 | Fu | G03B 30/00 |
| 2023/0341746 | A1* | 10/2023 | Chen | G03B 9/06 |

FOREIGN PATENT DOCUMENTS

| | | | | |
|---|---|---|---|---|
| CN | 113568252 | A | 10/2021 | |
| CN | 113568253 | A | 10/2021 | |
| CN | 113885269 | A | 1/2022 | |
| CN | 114285242 | A | 4/2022 | |
| WO | 2020/124553 | A1 | 6/2020 | |
| WO | WO-2022052039 | A1 * | 3/2022 | G03B 9/06 |

* cited by examiner

IMAGING LENS MODULE AND ELECTRONIC DEVICE

RELATED APPLICATIONS

This application claims priority to U.S. Provisional Application 63/440,057, filed on Jan. 19, 2023, which is incorporated by reference herein in its entirety.

BACKGROUND

Technical Field

The present disclosure relates to an imaging lens module and an electronic device, more particularly to an imaging lens module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry due to an overly shallow depth of field. Conventionally, a variable aperture stop can be used to change the depth of field for adjusting the blur degree of the background and controlling the amount of incident light, such that arranging a variable aperture stop in an optical system of an electronic device becomes a forward-looking subject. However, there is no specific space in the conventional optical system for accommodating the variable aperture stop, so that the design flexibility of the variable aperture stop is very limited, and the variable aperture stop needs to be accurately manufactured to be able to fit the limited space in the conventional optical system. This may also cause a poor integration of the variable aperture stop in the conventional optical system. Therefore, how to design a lens to have a highly integrated variable aperture stop therein for meeting the requirement of high-end-specification electronic devices is an important topic in this field nowadays.

SUMMARY

According to one aspect of the present disclosure, an imaging lens module includes at least one lens element, a lens carrier, and a variable through hole assembly. The at least one lens element has an optical axis. The lens carrier accommodates the at least one lens element. The lens carrier includes an object-side portion, an image-side portion, and a tubular portion. The object-side portion has an object-side opening configured for light entering the imaging lens module. The object-side portion forms a minimum opening of the lens carrier at the object-side opening. The image-side portion is opposite to the object-side portion. The tubular portion is connected to and located between the object-side portion and the image-side portion. The variable through hole assembly is disposed on the object-side portion. The variable through hole assembly includes a plurality of rotatable blades. The rotatable blades are rotatably disposed about the optical axis and configured to form a through hole, wherein a size of the through hole is variable. The object-side portion further has a guiding structure. The guiding structure guides movement of the plurality of rotatable blades and is located further away from the optical axis than the minimum opening. The object-side portion and the image-side portion form an air sleeve therebetween, and the air sleeve is located further away from the optical axis than the tubular portion.

According to another aspect of the present disclosure, an imaging lens module includes at least one lens element, a lens carrier, and a variable through hole assembly. The at least one lens element has an optical axis. The lens carrier accommodates the at least one lens element. The lens carrier includes an object-side portion, an image-side portion, and a tubular portion. The object-side portion has an object-side opening configured for light entering the imaging lens module. The object-side portion forms a minimum opening of the lens carrier at the object-side opening. The image-side portion is opposite to the object-side portion. The tubular portion is connected to and located between the object-side portion and the image-side portion. The variable through hole assembly is disposed on the object-side portion. The variable through hole assembly includes a plurality of rotatable blades and a blade driving part. The rotatable blades are rotatably disposed about the optical axis and configured to form a through hole, wherein a size of the through hole is variable. The blade driving part includes at least one driving magnet and at least one driving coil. The at least one driving magnet and the at least one driving coil are disposed opposite to each other along a direction parallel to the optical axis. The object-side portion further has a guiding structure. The guiding structure guides movement of the plurality of rotatable blades and is located further away from the optical axis than the minimum opening.

According to another aspect of the present disclosure, an electronic device includes one of the aforementioned imaging lens modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
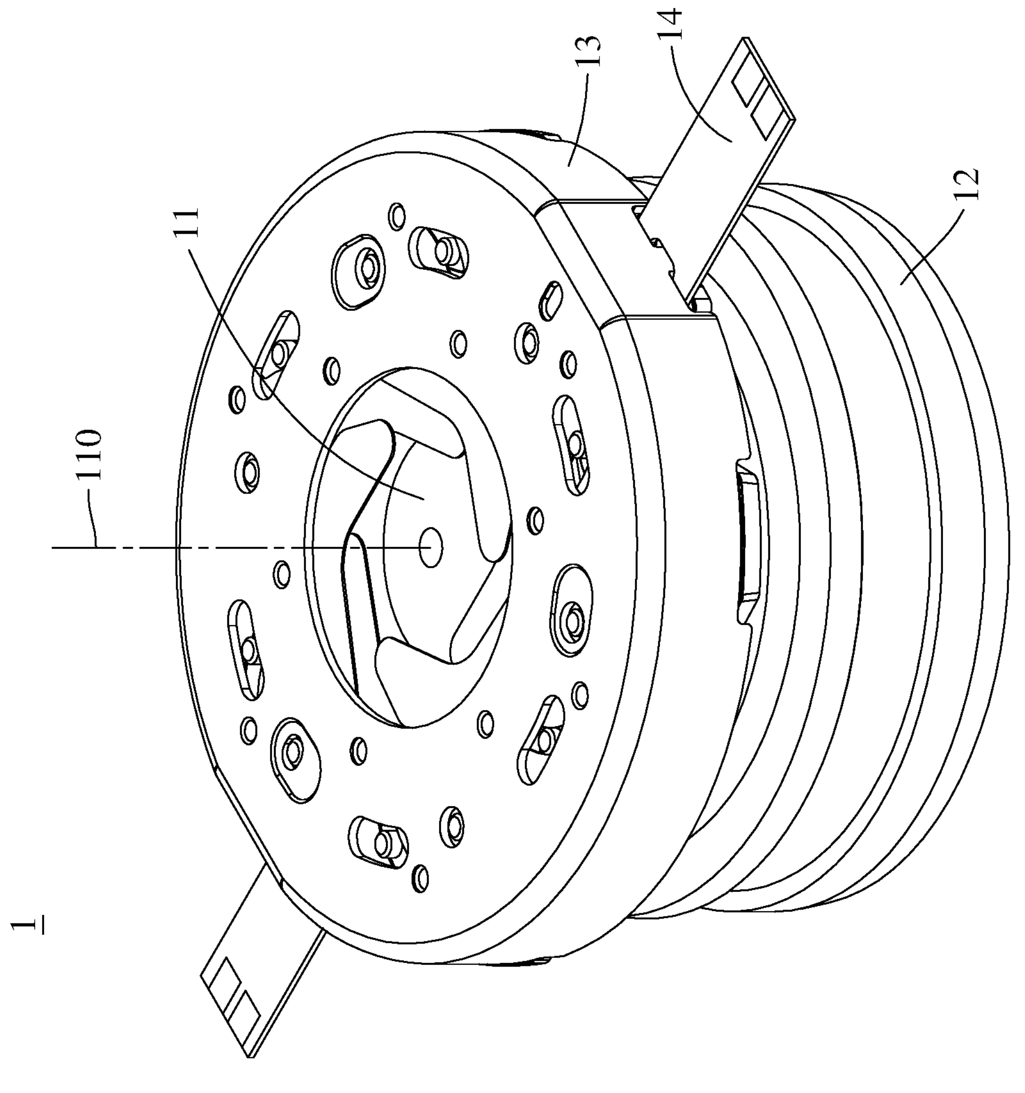
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module which includes at least one lens element, a lens carrier and a variable through hole assembly. The at least one lens element has an optical axis. The lens carrier accommodates the at least one lens element. Moreover, the lens carrier can be in physical contact with the at least one lens element. The variable through hole assembly is disposed on the lens carrier. The variable through hole assembly includes a plurality of rotatable blades that are rotatably disposed about the optical axis and configured to form a through hole, wherein a size of the through hole is variable.

Specifically, the lens carrier includes an object-side portion, an image-side portion and a tubular portion. The object-side portion is provided for the variable through hole assembly to be disposed thereon. The object-side portion has an object-side opening and a guiding structure. The object-side opening is configured for light entering the imaging lens module. The object-side portion can have an inclined structure at the object-side opening to form a minimum opening of the lens carrier at the narrowest position of the inclined structure. The guiding structure guides movement of the rotatable blades and is located further away from the optical axis than the minimum opening. The image-side portion is opposite to the object-side portion. The tubular portion is connected to and located between the object-side portion and the image-side portion.

With the designed structure of the lens carrier, the imaging lens module can have enough margin to integrate the variable through hole assembly and thus can be applicable to various scenarios so as to be applied to various electronic devices. Moreover, by the miniaturization design at the object-portion of the lens carrier, the imaging lens module is applicable to a small-headed lens with a small sized front end.

The object-side portion can further have a topmost surface, at least one slot, a first lateral wall, a second lateral wall and a third lateral wall. The topmost surface can be a surface of the object-side portion closest to an object side. Moreover, the topmost surface can extend in a direction perpendicular to the optical axis. The at least one slot can extend away from the topmost surface along a direction parallel to the optical axis. The first lateral wall can be located closer to the optical axis than the guiding structure. The second lateral wall can be located in the at least one slot, and the second lateral wall can be located closer to the optical axis than the first lateral wall. Therefore, it is favorable for maintaining the injection molding yield rate of the imaging lens module. The third lateral wall can be located in the at least one slot, and the third lateral wall can be located closer to the optical axis than the second lateral wall. Therefore, it is favorable for further maintaining the injection molding yield rate of the imaging lens module. Please refer to FIG. 5, which shows the topmost surface 1213 according to the 1st embodiment of the present disclosure. Please refer to FIG. 15 to FIG. 16 and FIG. 17 to FIG. 18, which respectively show the slots 5214*a* according to the 5th embodiment and the slots 6214*a* according to the 6th embodiment of the present disclosure. Please refer to FIG. 17 to FIG. 18, which show the slots 6214*b* according to the 6th embodiment of the present disclosure. Please refer to FIG. 4, which shows the first lateral wall 1215*a* according to the 1st embodiment of the present disclosure. Please refer to FIG. 15 to FIG. 16 and FIG. 17 to FIG. 18, which respectively show the second lateral walls 5215*b* according to the 5th embodiment and the second lateral walls 6215*b* according to the 6th embodiment of the present disclosure. Please refer to FIG. 17 to FIG. 18, which show the third lateral walls 6215*c* of the 6th embodiment of the present disclosure.

The object-side portion and the image-side portion can form an air sleeve therebetween. The air sleeve can be located further away from the optical axis than the tubular portion. The air sleeve can have an upper surface and a lower surface. The upper surface can be a surface extending along a direction perpendicular to the optical axis and can be a surface of the air sleeve closest to the object side along a direction parallel to the optical axis. The lower surface can be a surface extending along a direction perpendicular to the optical axis and can be a surface of the air sleeve closest to an image side along a direction parallel to the optical axis. Moreover, the object-side portion, the image-side portion and the air sleeve can overlap with one another along a direction parallel to the optical axis. It can also be considered that the upper surface can be a surface of the object-side portion, and the lower surface can be a surface of the image-side portion. Please refer to FIG. 3, which shows the air sleeve AS, the upper surface AS1 and the lower surface AS2 according to the 1st embodiment of the present disclosure.

The variable through hole assembly can further include a blade driving part. The blade driving part can include at least one driving magnet, at least one driving coil, a rotatable member and at least two rolling members.

The at least one driving magnet and the at least one driving coil can be disposed opposite to each other along a direction parallel to the optical axis. Moreover, the at least one driving magnet can be disposed above the at least one driving coil, but the present disclosure is not limited thereto. With the interaction between the at least one driving magnet and the at least one driving coil, the size of the through hole can be accurately and precisely controlled.

The rotatable member can be connected to the rotatable blades, and the rotatable member can drive the rotatable blades to vary the size of the through hole. Moreover, the rotatable member can be disposed opposite to the rotatable blades. Therefore, it is favorable for accurately and precisely controlling the size of the through hole.

The at least two rolling members can be spherical and can be disposed between the guiding structure and the rotatable member along a direction parallel to the optical axis to support rotation motion of the rotatable member. Specifically, the at least two rolling members are movable between the guiding structure and the rotatable member so as to rotate the rotatable member and guide the movement of the rotatable blades. The at least two rolling members can be located further away from the optical than the first lateral wall. Therefore, it is favorable for reducing the height of the variable through hole assembly, such that the maximum through hole of the variable through hole assembly can be close to the minimum opening of the lens carrier, and the size of the maximum through hole can approach the value used in the initial f-number of the overall optical system. Moreover, the at least two rolling members can be aligned with the optical axis. It can be also considered that the at least two rolling members can be located on the same plane perpendicular to the optical axis. It can be further considered that the at least two rolling members can be axisymmetric with respect to the optical axis. Therefore, it is favorable for enhancing rotational stability of the at least two rolling members.

According to the present disclosure, the imaging lens module can further include an auto-focus driving part. The auto-focus driving part can include an auto-focus magnet and at least one auto-focus coil disposed opposite to the at least one auto-focus magnet. One of the at least one auto-focus magnet and the at least one auto-focus coil is disposed in the air sleeve. The auto-focus driving part drives the lens carrier to move along a direction parallel to the optical axis. Therefore, it is favorable for performing auto-focus (AF). Please refer to FIG. 7, which shows the auto-focus driving part 26 and the auto-focus magnets 261 and the auto-focus coils 262 included therein according to the 2nd embodiment of the present disclosure.

When a maximum outer diameter of the object-side portion along a direction perpendicular to the optical axis is Do, and a maximum outer diameter of the image-side portion along the direction perpendicular to the optical axis is Di, the following condition can be satisfied: $0.9 \leq Do/Di \leq 2.5$. Therefore, it is favorable for maintaining the manufacturing yield rate. Please refer to FIG. 3, which shows Do and Di according to the 1st embodiment of the present disclosure.

When the maximum outer diameter of the object-side portion along the direction perpendicular to the optical axis is Do, the maximum outer diameter of the image-side portion along the direction perpendicular to the optical axis is Di, and a maximum outer diameter of the tubular portion along the direction perpendicular to the optical axis is Dt, the following condition can be satisfied: $4\ [mm] \leq Dt < Di < Do \leq 30\ [mm]$. Therefore, it is favorable for keeping the manufacturing yield rate at a relatively high level. Please refer to FIG. 3, which shows Dt according to the 1st embodiment of the present disclosure.

Each of the at least two rolling members can have a rolling center. When a distance between the rolling center and the topmost surface along a direction parallel to the optical axis is h1, and a height of the first lateral wall along a direction parallel to the optical axis is h2, the following condition can be satisfied: $1 \leq h2/h1 \leq 2.95$. Please refer to FIG. 3 and FIG. 4, which show h1 and h2 according to the 1st embodiment of the present disclosure.

When the height of the first lateral wall along the direction parallel to the optical axis is h2, and a height of the second lateral wall is h3, the following condition can be satisfied: $0 < h3/h2 \leq 1$. Please refer to FIG. 16 and FIG. 18, which show h2 and h3 according to the 5th and 6th embodiments of the present disclosure.

When the height of the second lateral wall is h3, and a height of the third lateral wall is h4, the following condition can be satisfied: $0 < h4/h3 \leq 1$. Therefore, it is favorable for separating the slots with different depths, thereby keeping the injection molding yield rate of the imaging lens module at a relatively high level. Please refer to FIG. 18, which shows h3 and h4 according to the 6th embodiment of the present disclosure.

When a distance between the upper surface and the lower surface along the direction parallel to the optical axis is Ha, and a height of the lens carrier is Hb, the following condition can be satisfied: $0.005 \leq Ha/Hb \leq 0.9$. Therefore, it is favorable for maintaining a specific height ratio of the air sleeve to the lens carrier. Please refer to FIG. 3, which shows Ha and Hb according to the 1st embodiment of the present disclosure.

When an f-number of the imaging lens module is FNO, the following condition can be satisfied: $1.4 \leq FNO \leq 4.0$. Therefore, it is favorable for changing the f-number by varying the size of the through hole for various photographing scenarios.

When a maximum field of view of the imaging lens module is FOV, the following condition can be satisfied: $50\ [deg.] \leq FOV \leq 105\ [deg.]$. Therefore, it is favorable for having a proper maximum field of view to allow the size of the through hole controllable.

The present disclosure provides an electronic device that include the abovementioned imaging lens module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
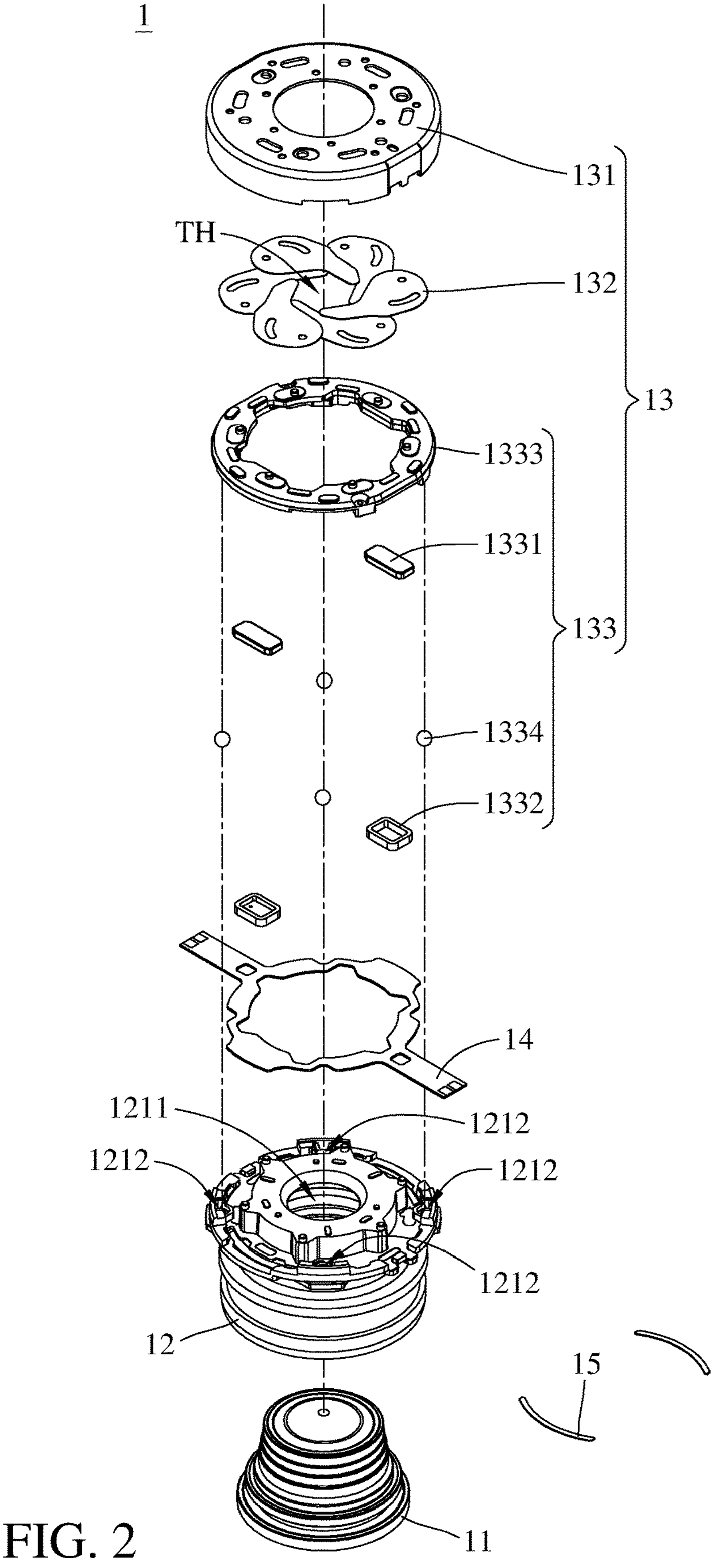
FIG. 2 is an exploded view of the imaging lens module in FIG. 1.
Figure 3:
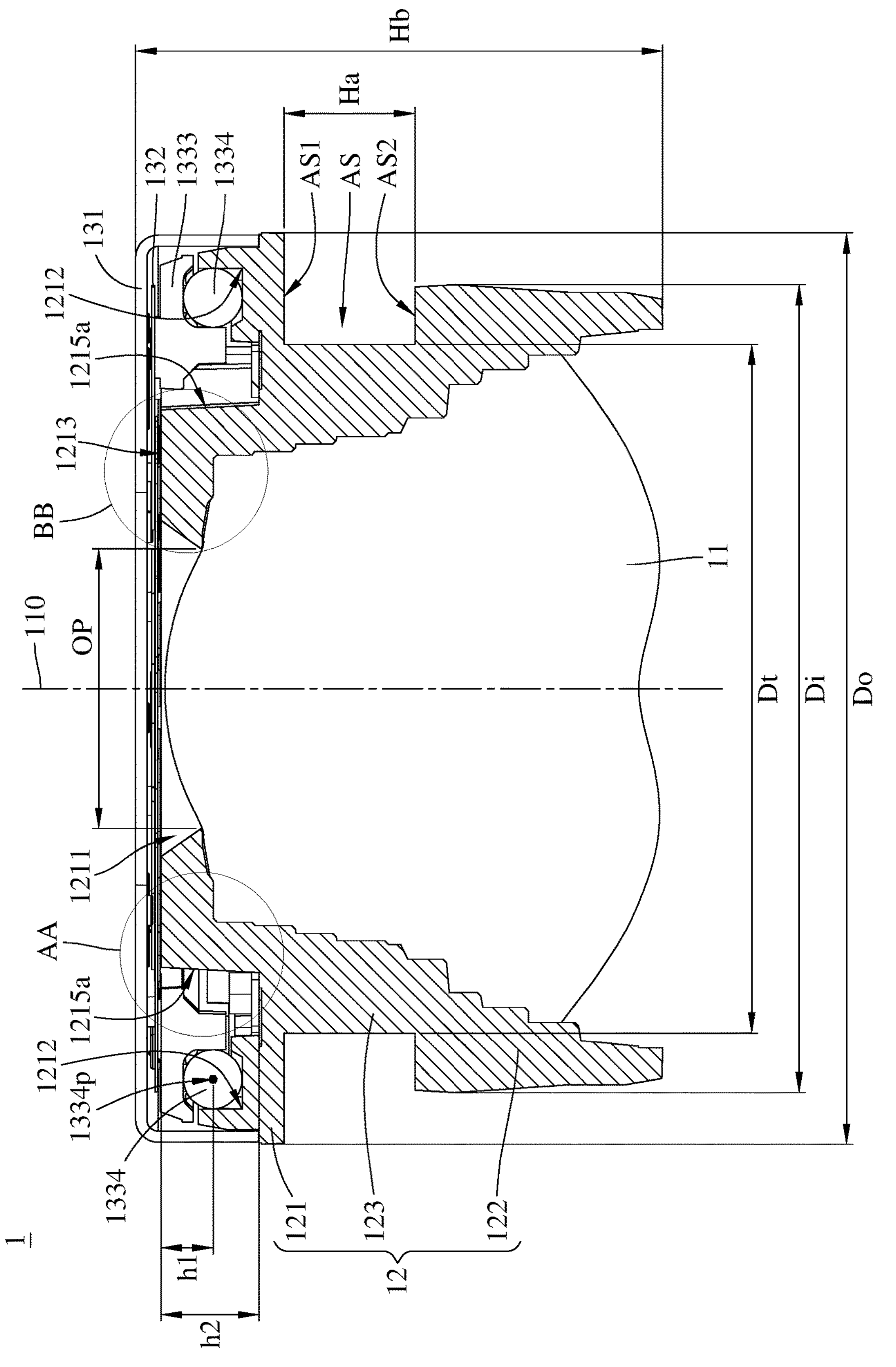
FIG. 3 is a cross-sectional view of the imaging lens module in FIG. 1.
Figure 4:
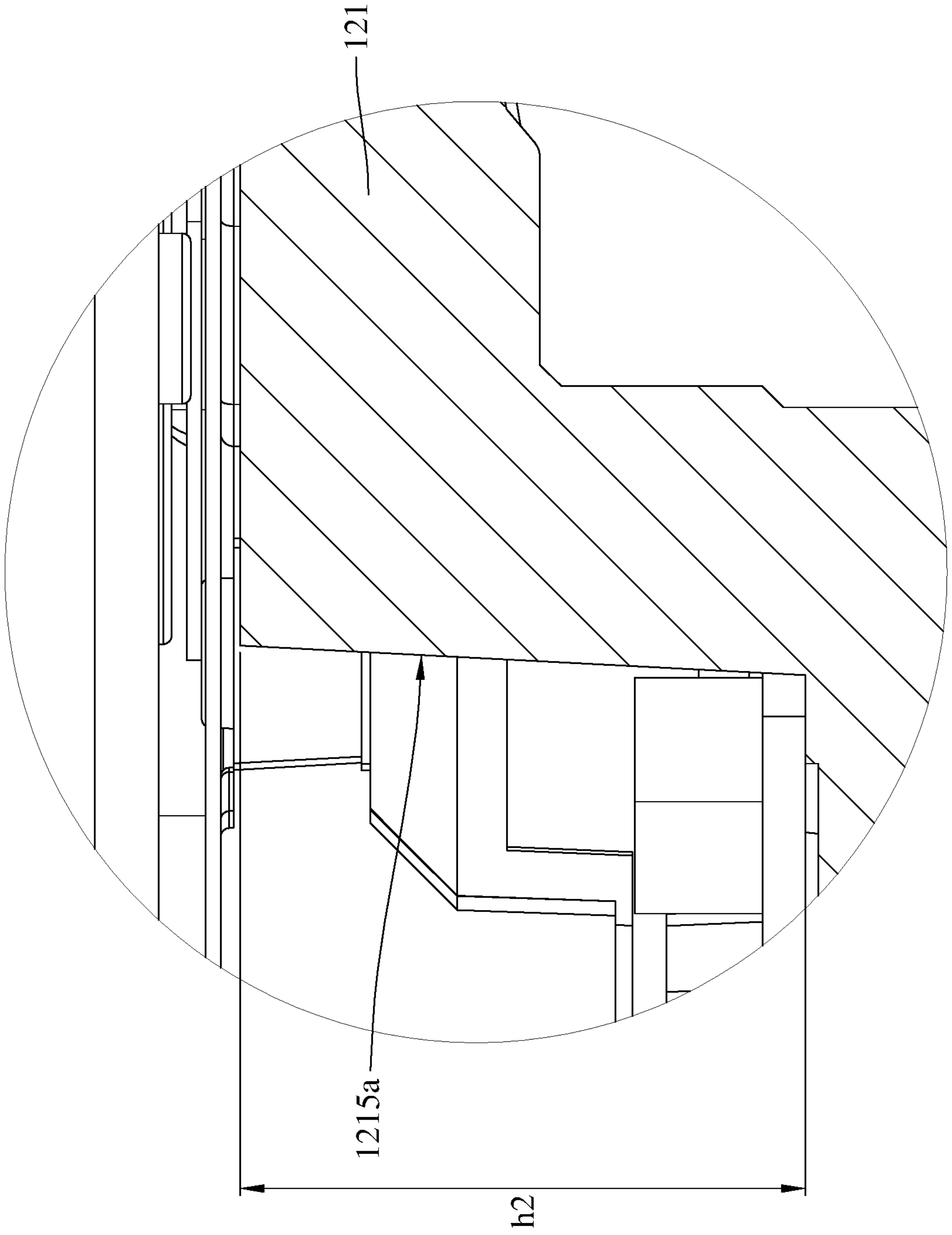
FIG. 4 is an enlarged view of AA region in FIG. 3.
Figure 5:
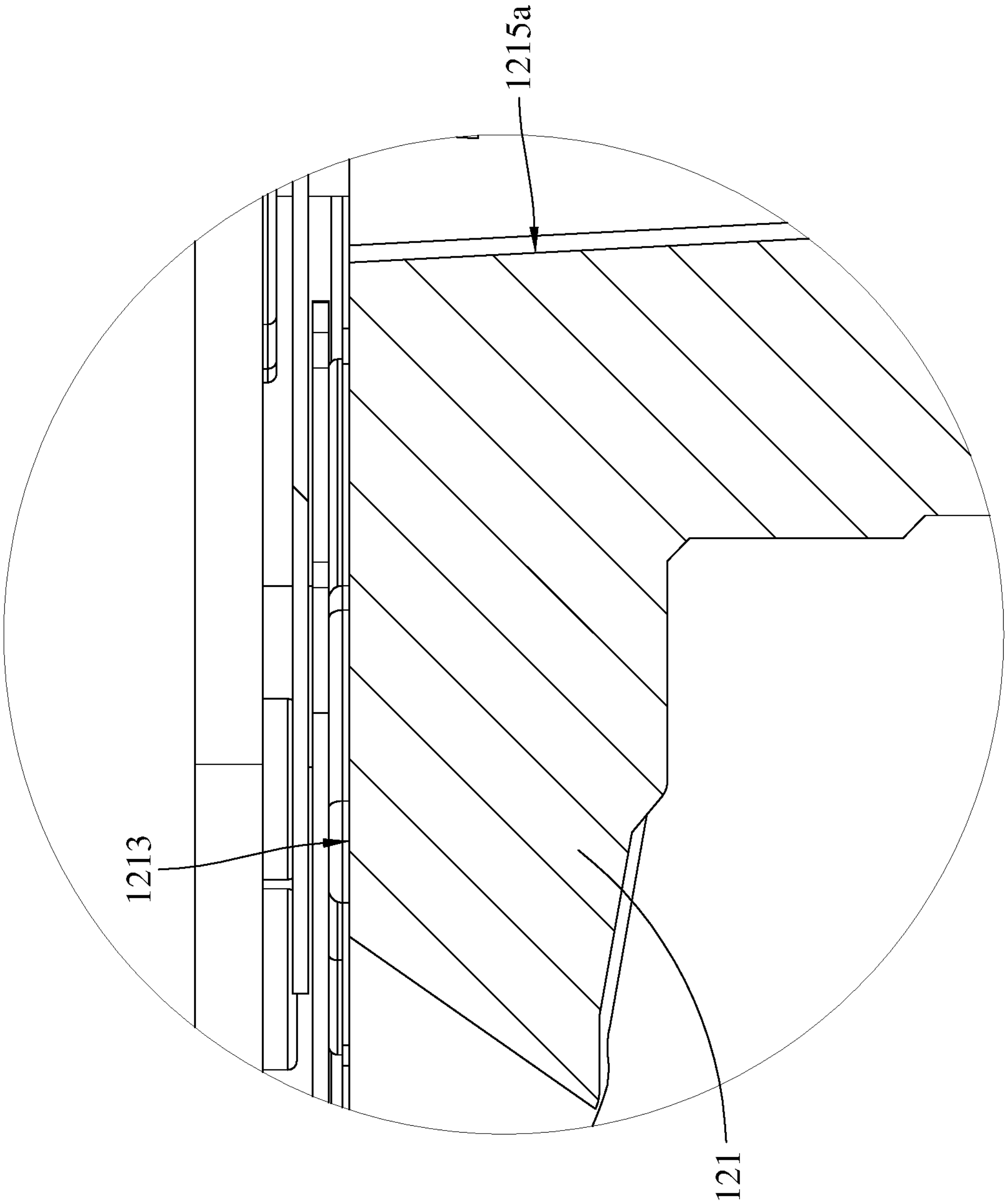
FIG. 5 is an enlarged view of BB region in FIG. 3.
Figure 6:
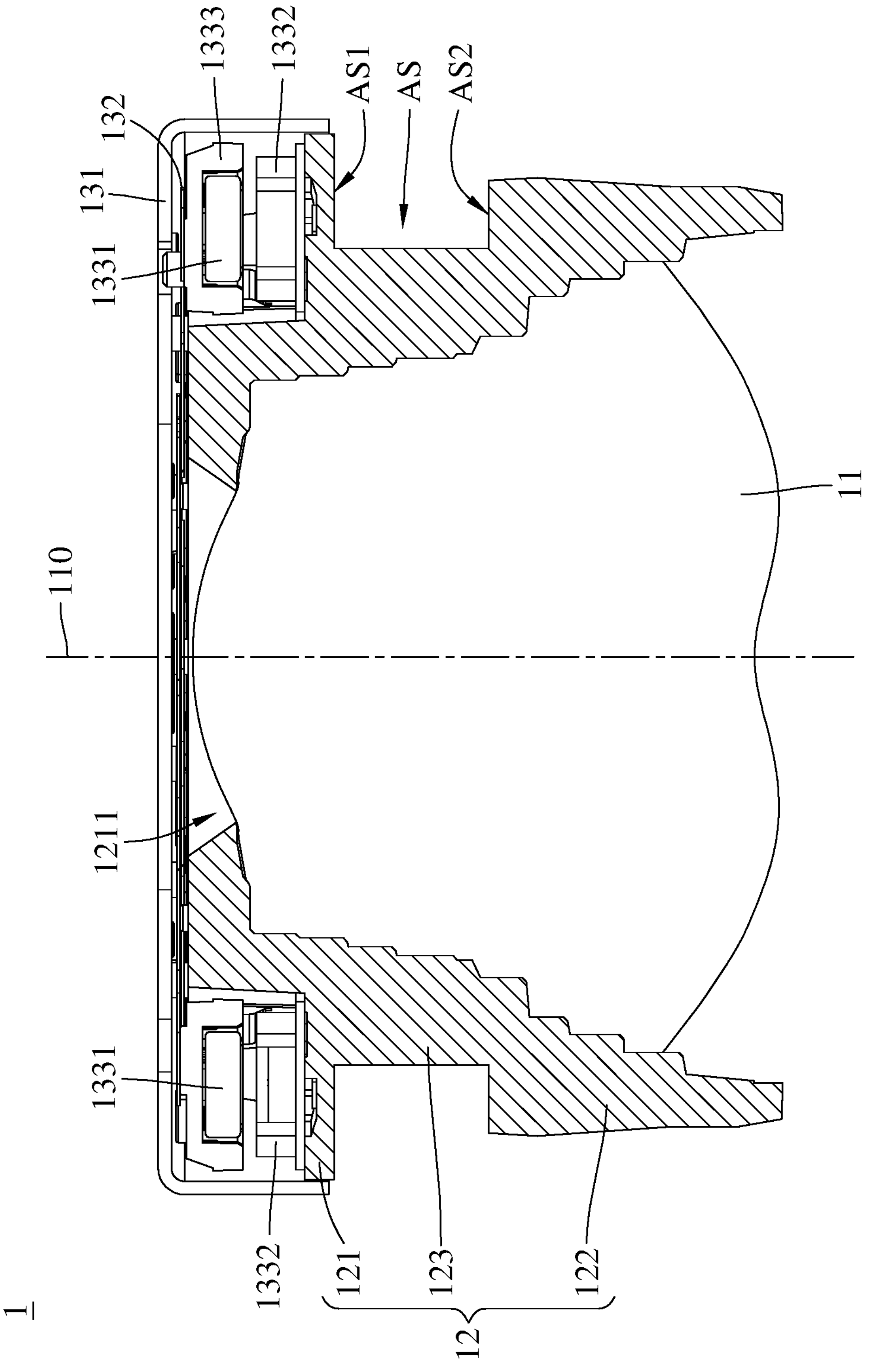
FIG. 6 is another cross-sectional view of the imaging lens module in FIG. 1.

Please refer to FIG. 1 to FIG. 6, where FIG. 1 is a perspective view of an imaging lens module according to the 1st embodiment of the present disclosure, FIG. 2 is an exploded view of the imaging lens module in FIG. 1, FIG. 3 is a cross-sectional view of the imaging lens module in FIG. 1, FIG. 4 is an enlarged view of AA region in FIG. 3, FIG. 5 is an enlarged view of BB region in FIG. 3, and FIG. 6 is another cross-sectional view of the imaging lens module in FIG. 1.

This embodiment provides an imaging lens module 1 which includes a plurality of lens elements 11, a lens carrier 12, a variable through hole assembly 13, a flexible circuit board 14 and a plurality of magnetic members 15.

The lens elements 11 have an optical axis 110. The quantity, shapes and thicknesses of the lens elements 11 are not intended to restrict the present disclosure, and the contours of the lens elements 11 are not specifically shown in the drawings for preventing obscuring the present disclosure.

The lens carrier 12 is in physical contact with the lens elements 11 at an inner side thereof so as to accommodate the lens elements 11. The lens carrier 12 includes an object-side portion 121, an image-side portion 122 and a tubular portion 123. The image-side portion 122 is opposite to the object-side portion 121. The tubular portion 123 is connected to and located between the object-side portion 121 and the image-side portion 122.

Specifically, the object-side portion 121 has an object-side opening 1211, a plurality of guiding structures 1212, a topmost surface 1213 and a plurality of first lateral walls 1215*a*.

The object-side opening 1211 is configured for light entering the imaging lens module 1, and the object-side portion 121 form a minimum opening OP of the lens carrier 12 at the object-side opening 1211.

The guiding structures 1212 are located further away from the optical axis 110 than the minimum opening OP.

The topmost surface 1213 extends along a direction perpendicular to the optical axis 110 and is served as a surface of the object-side portion 121 closest to an object side. Further, the topmost surface 1213 is served as an outer surface of the object-side portion 121 extending along a direction perpendicular to the optical axis 110.

The first lateral walls 1215*a* are located closer to the optical axis 110 than the guiding structures 1212.

The object-side portion 121 and the image-side portion 122 form an air sleeve AS therebetween. The air sleeve AS is located further away from the optical axis 110 than the tubular portion 123. The air sleeve AS has an upper surface AS1 and a lower surface AS2. The upper surface AS1 extends along a direction perpendicular to the optical axis 110 and is the surface of the air sleeve AS closest to the object side along a direction parallel to the optical axis 110. The lower surface AS2 extends along a direction perpendicular to the optical axis 110 and is the surface of the air sleeve AS closest to an image side along a direction parallel to the optical axis 110. Also, the object-side portion 121, the image-side portion 122 and the air sleeve AS overlap with one another along a direction parallel to the optical axis 110.

The variable through hole assembly 13 is disposed on the object-side portion 121. The variable through hole assembly 13 includes a cover 131, a plurality of rotatable blades 132 and a blade driving part 133. The rotatable blades 132 are rotatably disposed between the cover 131 and the blade driving part 133 about the optical axis 110. The guiding structures 1212 are able to guide the rotation motion of the rotatable blades 132. The rotatable blades 132 are configured to form a through hole TH, and the size of the through hole TH is variable.

The blade driving part 133 includes a plurality of driving magnets 1331, a plurality of driving coils 1332, a rotatable member 1333 and a plurality of rolling members 1334.

The driving magnets 1331 are disposed opposite to respective driving coils 1332 along a direction parallel to the optical axis 110, and the driving magnets 1331 are disposed above the driving coils 1332.

The rotatable member 1333 is connected to the rotatable blades 132 and is disposed opposite to the rotatable blades 132, and the rotatable member 1333 rotates the rotatable blades 132 to vary the size of the through hole TH.

The rolling members 1334 are spherical. The rolling members 1334 are disposed between the guiding structures 1212 and the rotatable member 1333 along a direction parallel to the optical axis 110 and are movable therebetween to support rotation motion of the rotatable member 1333, thereby guiding rotation motion of the rotatable blades 132. Also, the rolling members 1334 are located further away from the optical axis 110 than the first lateral walls 1215*a* and are aligned with the optical axis 110.

The flexible circuit board 14 is disposed between the lens carrier 12 and the variable through hole assembly 13 so as to transmit control signals to the driving coils 1332.

The magnetic members 15 are disposed on the lens carrier 12 so as to provide a magnetic field for interacting with the driving magnets 1331.

When a maximum outer diameter of the object-side portion 121 along a direction perpendicular to the optical axis 110 is Do, and a maximum outer diameter of the image-side portion 122 along the direction perpendicular to the optical axis 110 is Di, a maximum outer diameter of the tubular portion 123 along the direction perpendicular to the optical axis 110 is Dt, the following conditions are satisfied: Do=12.30 [mm]; Di=10.91 [mm]; Dt=9.29 [mm]; Do/Di=1.13; and 4 [mm]≤Dt<Di<Do≤30 [mm].

Each rolling member 1334 has a rolling center 1334*p*. When a distance between the rolling center 1334*p* and the topmost surface 1213 along a direction parallel to the optical axis 110 is h1, and a height of the first lateral walls 1215*a* along a direction parallel to the optical axis 110 is h2, the following conditions are satisfied: h1=0.7 [mm]; h2=1.33 [mm]; and h2/h1=1.9.

When a distance between the upper surface AS1 and the lower surface AS2 along the direction parallel to the optical axis 110 is Ha, and a height of the lens carrier 12 is Hb, the following conditions are satisfied: Ha=1.76 [mm]; Hb=6.76 [mm]; and Ha/Hb=0.26.

When an f-number of the imaging lens module 1 is FNO, the following condition is satisfied:

$$1.4 \leq FNO \leq 4.0.$$

When a maximum field of view of the imaging lens module 1 is FOV, the following condition is satisfied:

$$50\ [\text{deg.}] \leq FOV \leq 105\ [\text{deg.}].$$

2nd Embodiment

Figure 7:
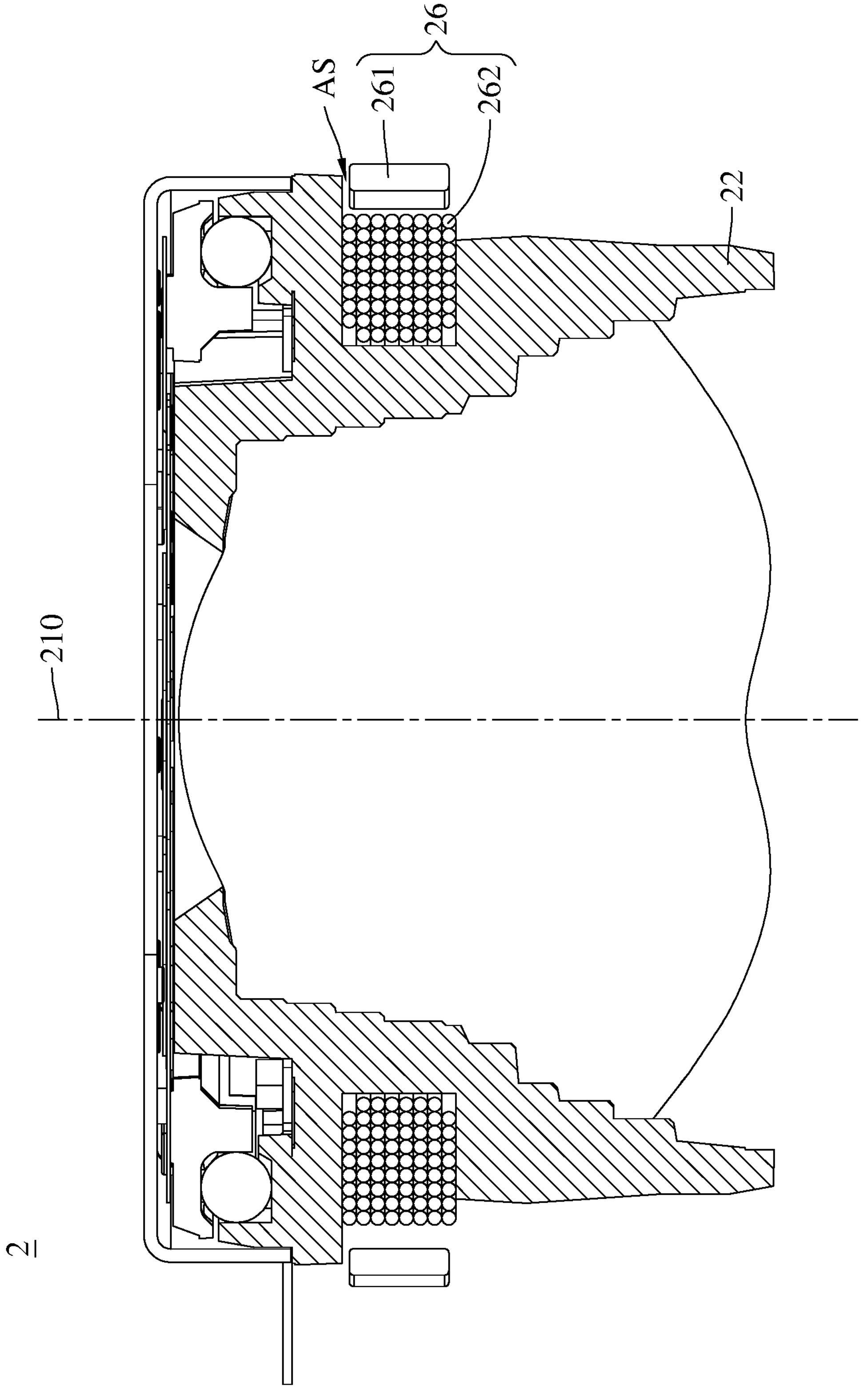
FIG. 7 is a cross-sectional view of an imaging lens module according to the 2nd embodiment of the present disclosure.

Please refer to FIG. 7, which is a cross-sectional view of an imaging lens module according to the 2nd embodiment of the present disclosure.

This embodiment provides an imaging lens module 2 which is similar with the imaging lens module 1 of the abovementioned 1st embodiment. Therefore, only differences between the imaging lens module 2 and the imaging lens module 1, as well as necessary descriptions, will be illustrated hereinafter.

The imaging lens module 2 further includes an auto-focus driving part 26. The auto-focus driving part 26 includes a plurality of auto-focus magnets 261 and an auto-focus coil 262 disposed opposite to the auto-focus magnets 261. The auto-focus coil 262 is disposed in the air sleeve AS. The auto-focus driving part 26 is able to drive the lens carrier 22 to move along a direction parallel to the optical axis 210.

3rd Embodiment

Figure 8:
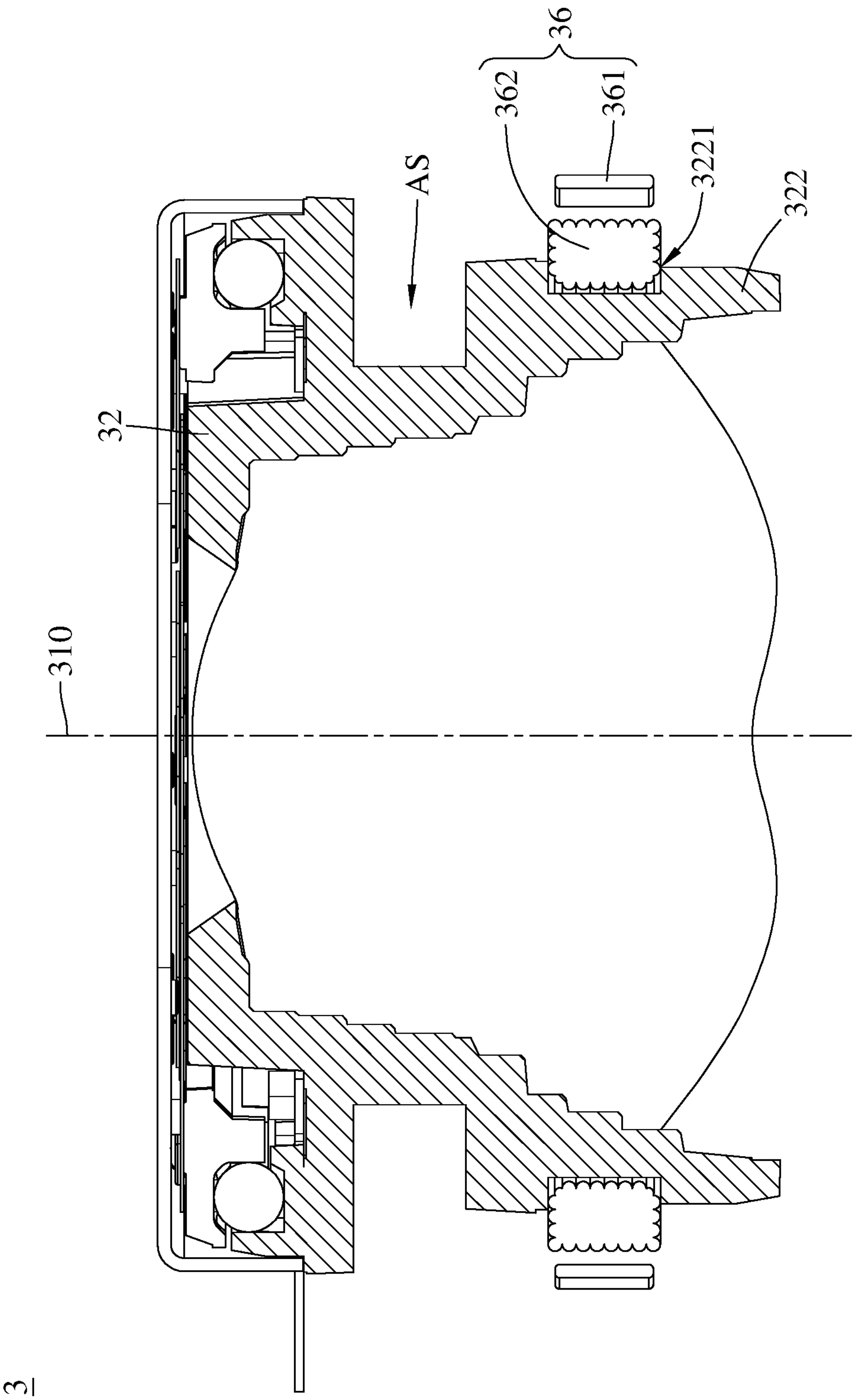
FIG. 8 is a cross-sectional view of an imaging lens module according to the 3rd embodiment of the present disclosure.

Please refer to FIG. 8, which is a cross-sectional view of an imaging lens module according to the 3rd embodiment of the present disclosure.

This embodiment provides an imaging lens module 3 which is similar with the imaging lens module 1 of the abovementioned 1st embodiment. Therefore, only differences between the imaging lens module 3 and the imaging lens module 1, as well as necessary descriptions, will be illustrated hereinafter.

The image-side portion 322 of the imaging lens module 3 has a recess 3221 which is located closer to the image side than the air sleeve AS. The imaging lens module 3 further includes an auto-focus driving part 36. The auto-focus driving part 36 includes a plurality of auto-focus magnets 361 and an auto-focus coil 362 disposed opposite to the auto-focus magnets 361. The auto-focus coil 362 is disposed in the recess 3221. The auto-focus driving part 36 is able to drive the lens carrier 32 to move along a direction parallel to the optical axis 310.

4th Embodiment

Figure 9:
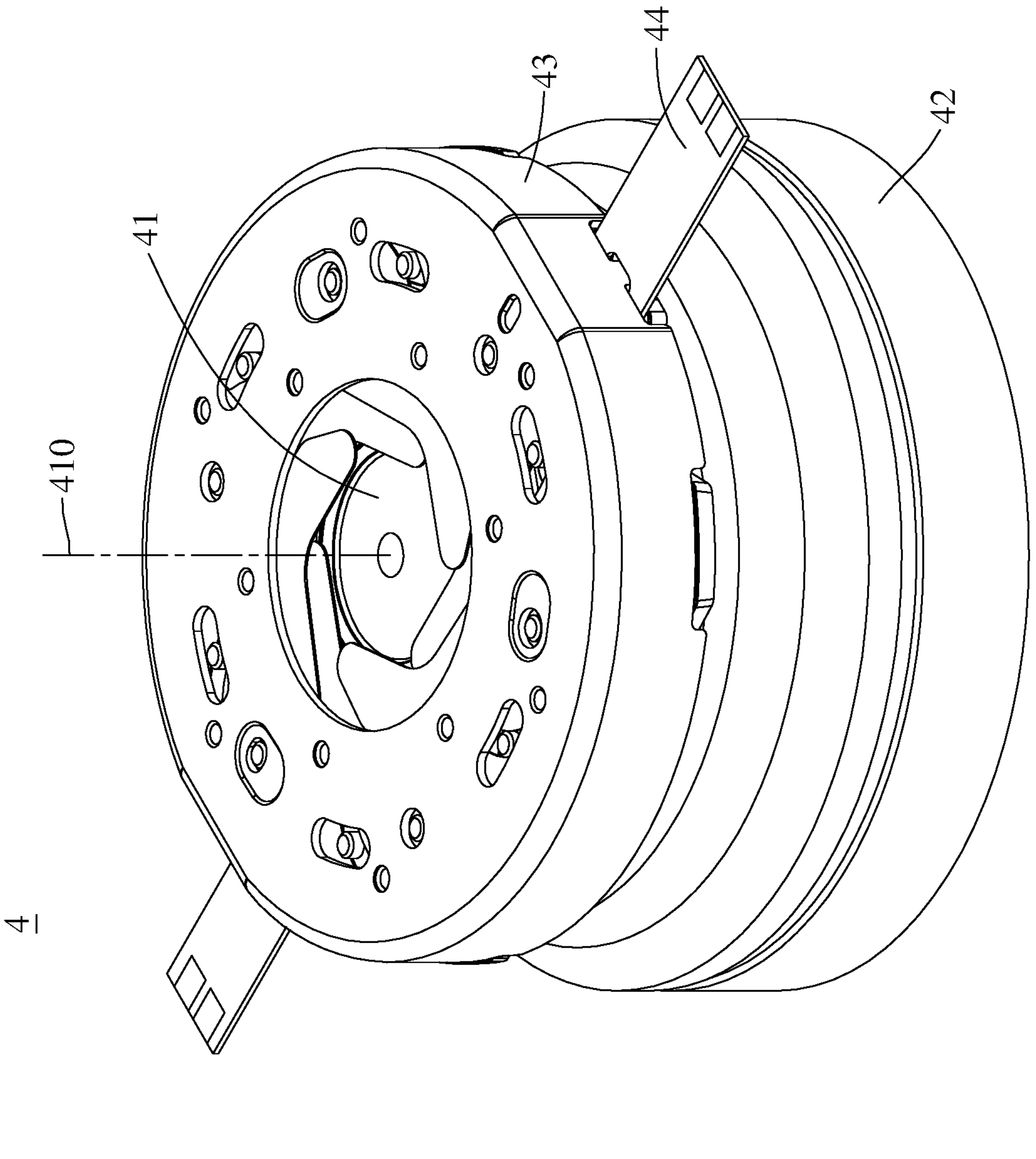
FIG. 9 is a perspective view of an imaging lens module according to the 4th embodiment of the present disclosure.
Figure 10:
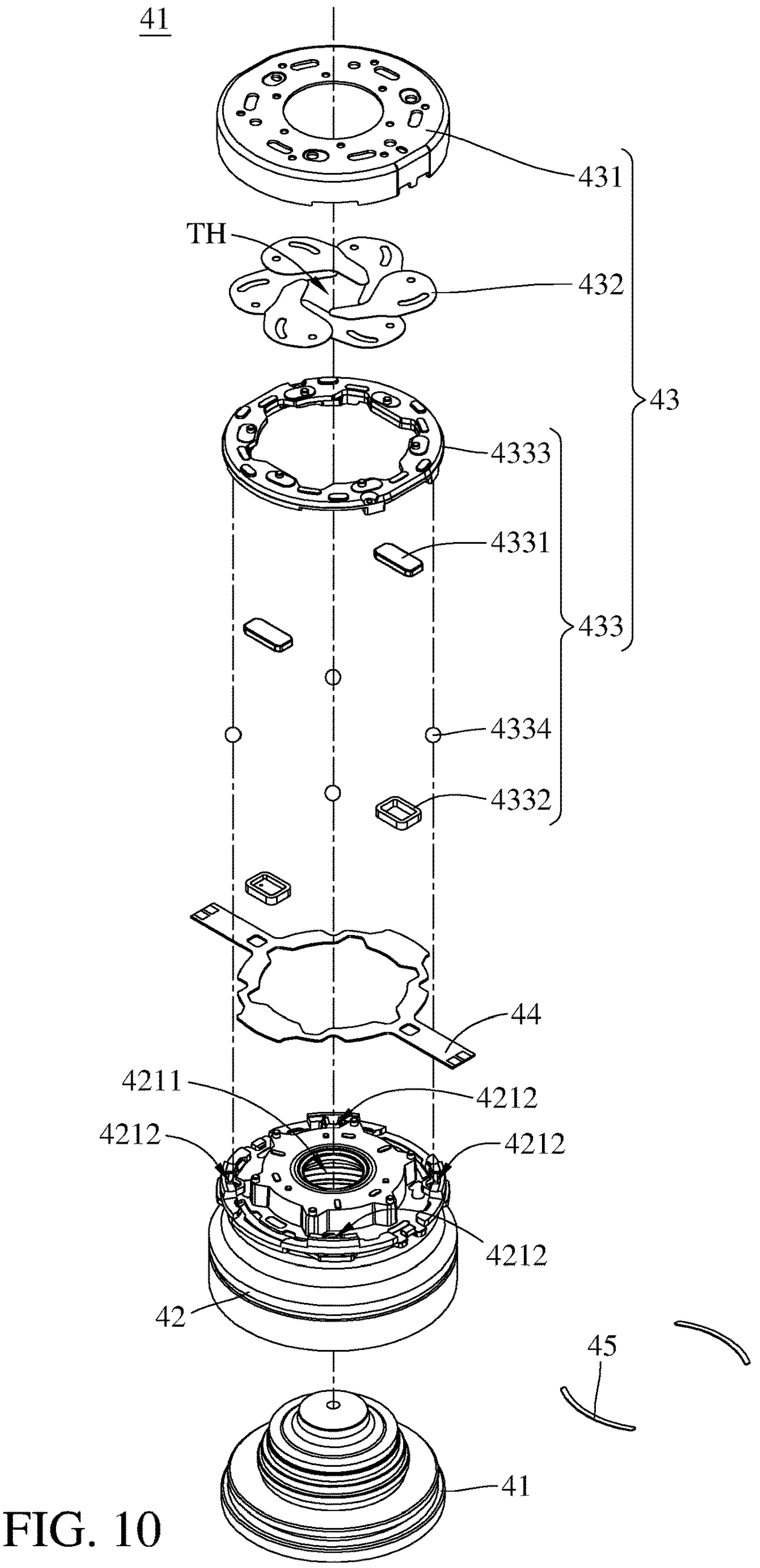
FIG. 10 is an exploded view of the imaging lens module in FIG. 9.
Figure 11:
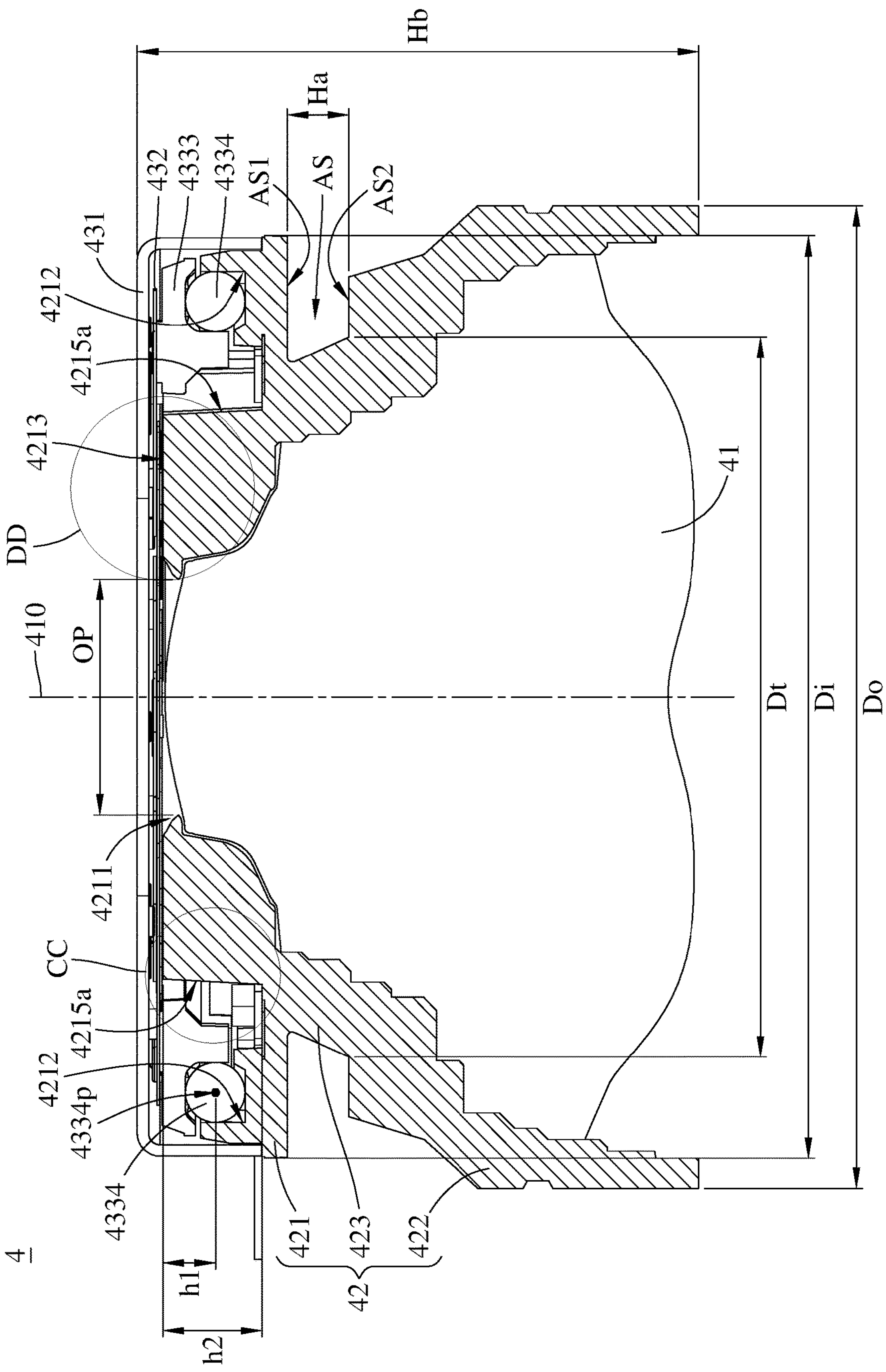
FIG. 11 is a cross-sectional view of the imaging lens module in FIG. 9.
Figure 12:
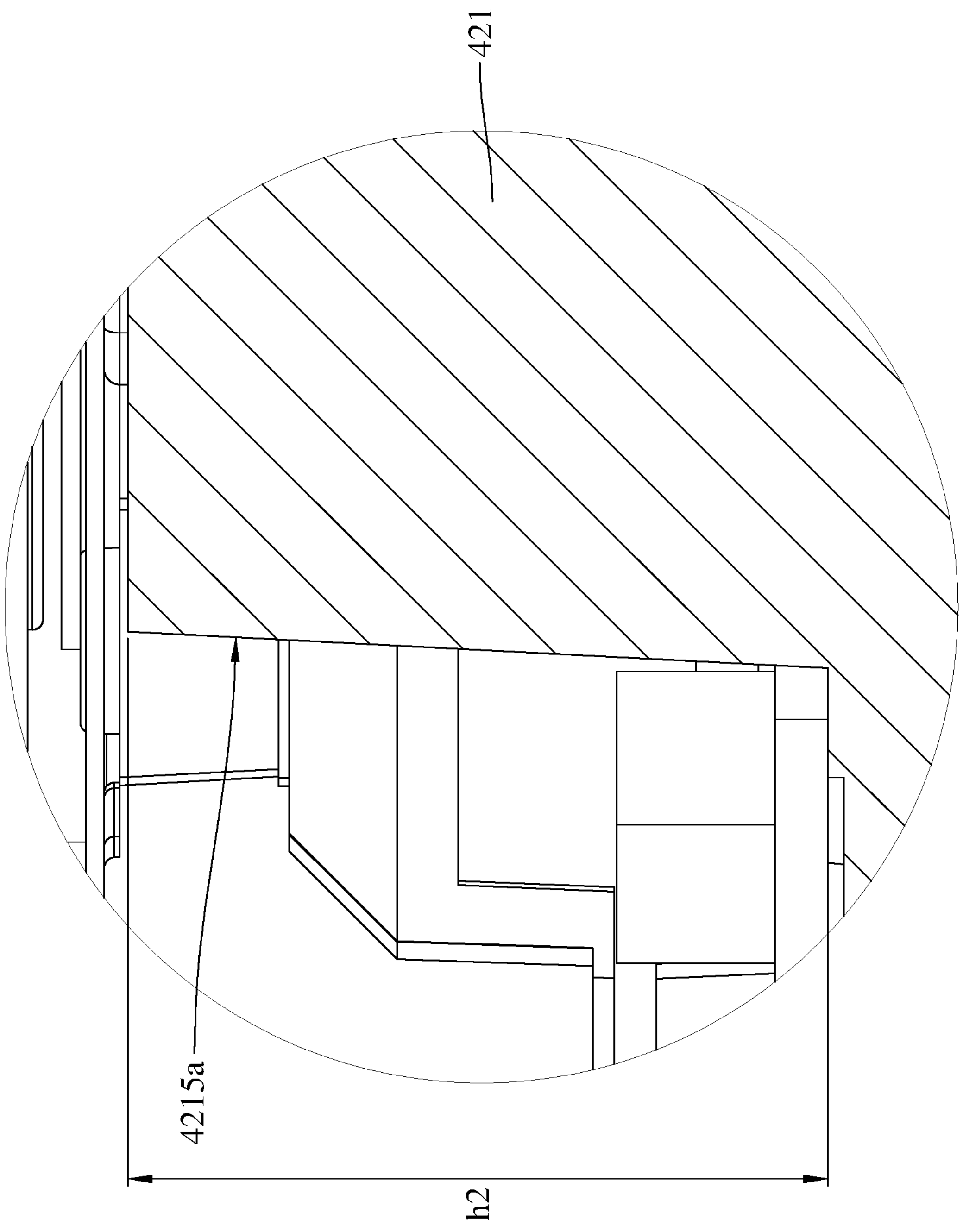
FIG. 12 is an enlarged view of CC region in FIG. 11.
Figure 13:
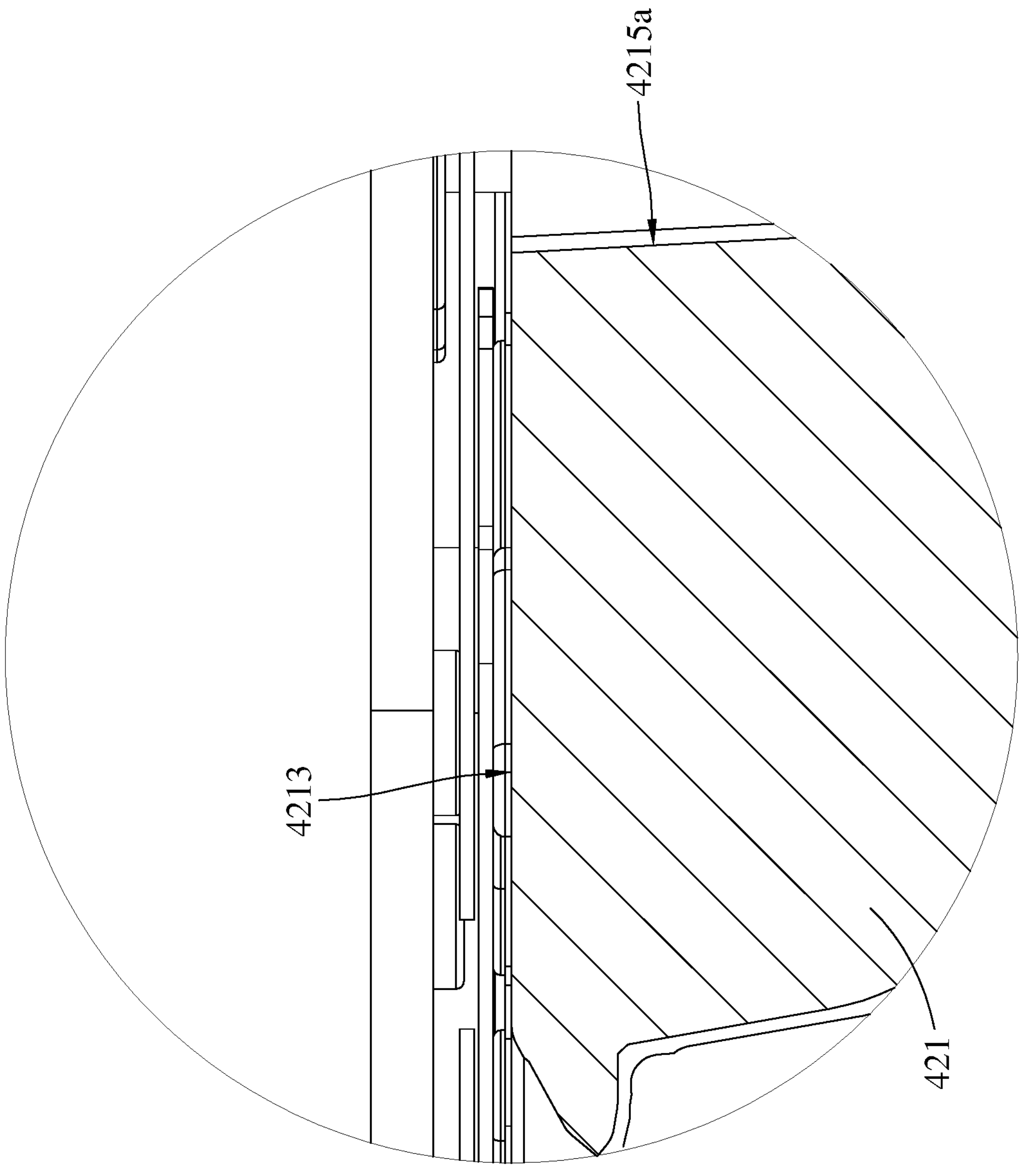
FIG. 13 is an enlarged view of DD region in FIG. 11.
Figure 14:
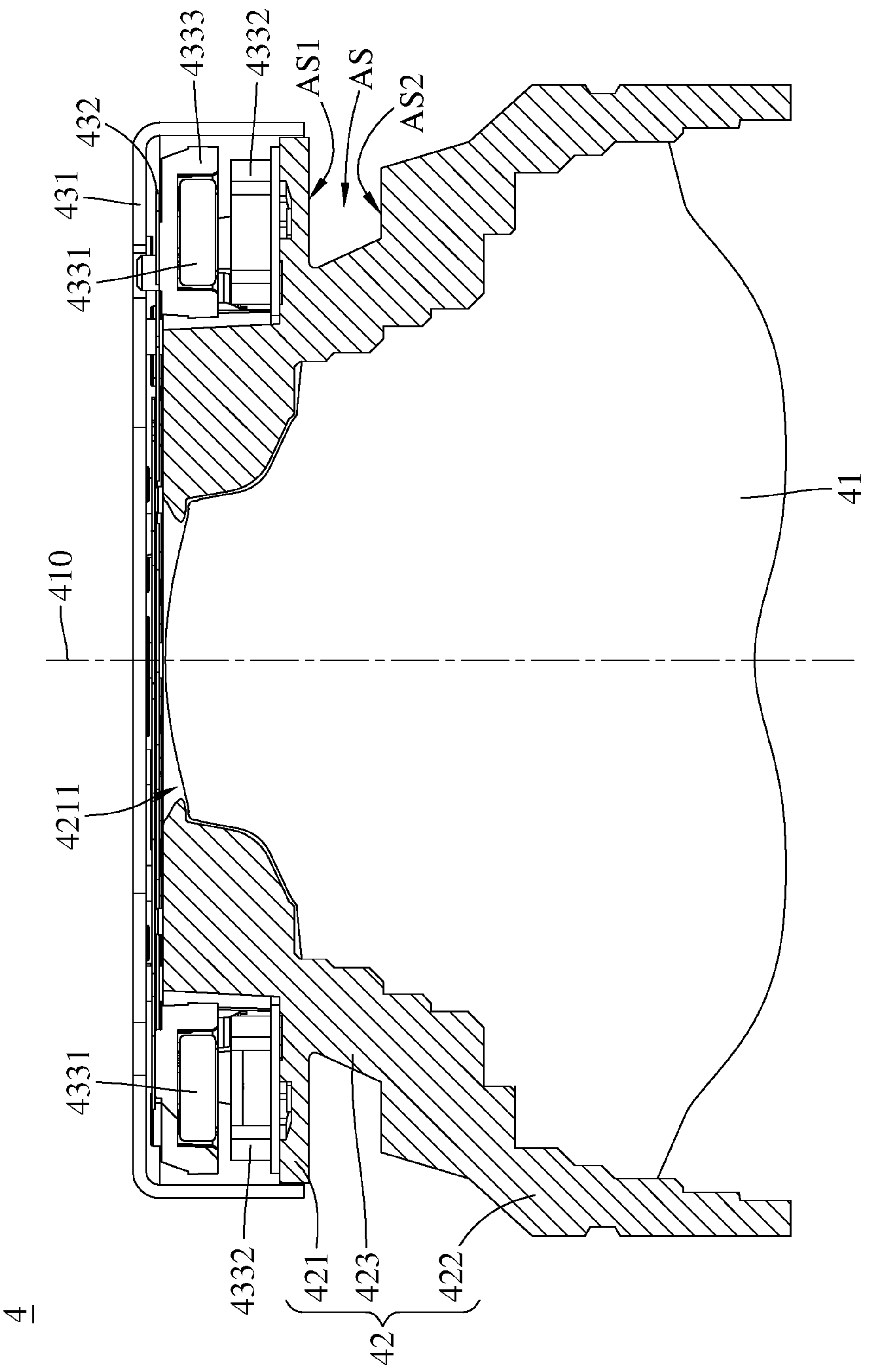
FIG. 14 is another cross-sectional view of the imaging lens module in FIG. 9.

Please refer to FIG. 9 to FIG. 14, where FIG. 9 is a perspective view of an imaging lens module according to the 4th embodiment of the present disclosure, FIG. 10 is an exploded view of the imaging lens module in FIG. 9, FIG. 11 is a cross-sectional view of the imaging lens module in FIG. 9, FIG. 12 is an enlarged view of CC region in FIG. 11, FIG. 13 is an enlarged view of DD region in FIG. 11, and FIG. 14 is another cross-sectional view of the imaging lens module in FIG. 9.

This embodiment provides an imaging lens module 4 which includes a plurality of lens elements 41, a lens carrier 42, a variable through hole assembly 43, a flexible circuit board 44 and a plurality of magnetic members 45.

The lens elements 41 have an optical axis 410. The quantity, shapes and thicknesses of the lens elements 41 are not intended to restrict the present disclosure, and the contours of the lens elements 41 are not specifically shown in the drawings for preventing obscuring the present disclosure.

The lens carrier 42 is in physical contact with the lens elements 41 at an inner side thereof so as to accommodate the lens elements 41. The lens carrier 42 includes an object-side portion 421, an image-side portion 422 and a tubular portion 423. The image-side portion 422 is opposite to the object-side portion 421. The tubular portion 423 is connected to and located between the object-side portion 421 and the image-side portion 422.

Specifically, the object-side portion 421 has an object-side opening 4211, a plurality of guiding structures 4212, a topmost surface 4213 and a plurality of first lateral walls 4215*a*.

The object-side opening 4211 is configured for light entering the imaging lens module 4, and the object-side portion 421 form a minimum opening OP of the lens carrier 42 at the object-side opening 4211.

The guiding structures 4212 are located further away from the optical axis 410 than the minimum opening OP.

The topmost surface 4213 extends along a direction perpendicular to the optical axis 410 and is served as a surface of the object-side portion 421 closest to an object side. Further, the topmost surface 4213 is served as an outer surface of the object-side portion 421 extending along a direction perpendicular to the optical axis 410.

The first lateral walls 4215*a* are located closer to the optical axis 410 than the guiding structures 4212.

The object-side portion 421 and the image-side portion 422 form an air sleeve AS therebetween. The air sleeve AS is located further away from the optical axis 410 than the tubular portion 423. The air sleeve AS has an upper surface AS1 and a lower surface AS2. The upper surface AS1 extends along a direction perpendicular to the optical axis 410 and is the surface of the air sleeve AS closest to the object side along a direction parallel to the optical axis 410. The lower surface AS2 extends along a direction perpendicular to the optical axis 410 and is the surface of the air sleeve AS closest to an image side along a direction parallel to the optical axis 410. Also, the object-side portion 421, the image-side portion 422 and the air sleeve AS overlap with one another along a direction parallel to the optical axis 410.

The variable through hole assembly 43 is disposed on the object-side portion 421. The variable through hole assembly 43 includes a cover 431, a plurality of rotatable blades 432 and a blade driving part 433. The rotatable blades 432 are rotatably disposed between the cover 431 and the blade driving part 433 about the optical axis 410. The guiding structures 4212 are able to guide the rotation motion of the rotatable blades 432. The rotatable blades 432 are configured to form a through hole TH, and the size of the through hole TH is variable.

The blade driving part 433 includes a plurality of driving magnets 4331, a plurality of driving coils 4332, a rotatable member 4333 and a plurality of rolling members 4334.

The driving magnets 4331 are disposed opposite to respective driving coils 4332 along a direction parallel to the optical axis 410, and the driving magnets 4331 are disposed above the driving coils 4332.

The rotatable member 4333 is connected to the rotatable blades 432 and is disposed opposite to the rotatable blades 432, and the rotatable member 4333 rotates the rotatable blades 432 to vary the size of the through hole TH.

The rolling members 4334 are spherical. The rolling members 4334 are disposed between the guiding structures 4212 and the rotatable member 4333 along a direction parallel to the optical axis 410 and are movable therebetween to support rotation motion of the rotatable member 4333, thereby guiding rotation motion of the rotatable blades 432. Also, the rolling members 4334 are located further away from the optical axis 410 than the first lateral walls 4215*a* and are aligned with the optical axis 410.

The flexible circuit board 44 is disposed between the lens carrier 42 and the variable through hole assembly 43 so as to transmit control signals to the driving coils 4332.

The magnetic members 45 are disposed on the lens carrier 42 so as to provide a magnetic field for interacting with the driving magnets 4331.

When a maximum outer diameter of the object-side portion 421 along a direction perpendicular to the optical axis 410 is Do, and a maximum outer diameter of the image-side portion 422 along the direction perpendicular to the optical axis 410 is Di, a maximum outer diameter of the tubular portion 423 along the direction perpendicular to the optical axis 410 is Dt, the following conditions are satisfied:

Do=6.55 [mm]; Di=6.15 [mm]; Dt=4.8 [mm]; Do/Di=1.07; and 4 [mm]≤Dt<Di<Do≤30 [mm].

Each rolling member 4334 has a rolling center 4334*p*. When a distance between the rolling center 4334*p* and the topmost surface 4213 along a direction parallel to the optical axis 410 is h1, and a height of the first lateral walls 4215*a* along a direction parallel to the optical axis 410 is h2, the following conditions are satisfied: h1=0.35 [mm]; h2=0.66 [mm]; and h2/h1=1.89.

When a distance between the upper surface AS1 and the lower surface AS2 along the direction parallel to the optical axis 410 is Ha, and a height of the lens carrier 42 is Hb, the following conditions are satisfied: Ha=0.41 [mm]; Hb=3.57 [mm]; and Ha/Hb=0.11.

When an f-number of the imaging lens module 4 is FNO, the following condition is satisfied: 1.4≤FNO≤4.0.

When a maximum field of view of the imaging lens module 4 is FOV, the following condition is satisfied: 50 [deg.]≤FOV≤105 [deg.].

5th Embodiment

Figure 15:
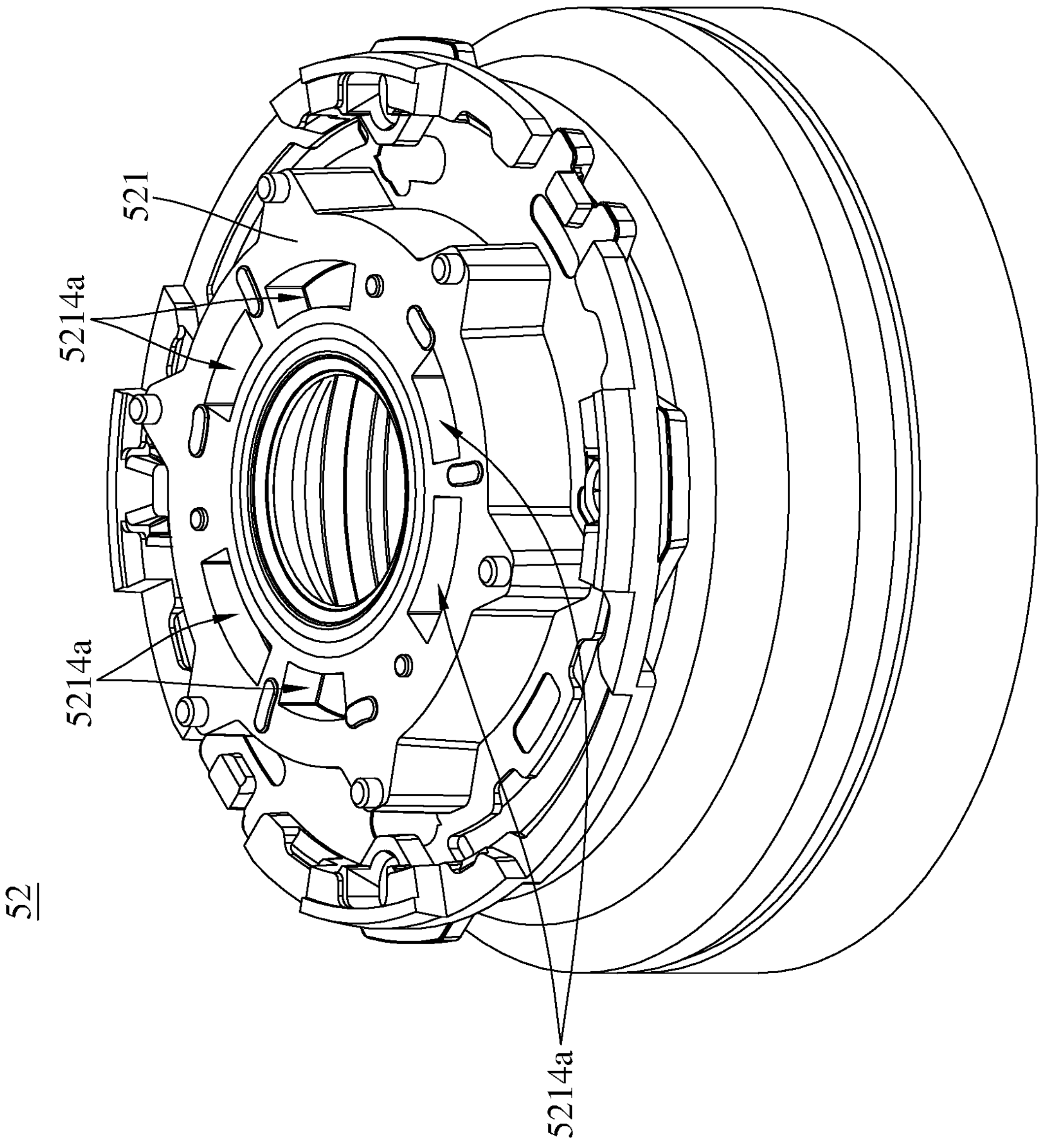
FIG. 15 is a perspective view of a lens carrier of an imaging lens module according to the 5th embodiment of the present disclosure.
Figure 16:
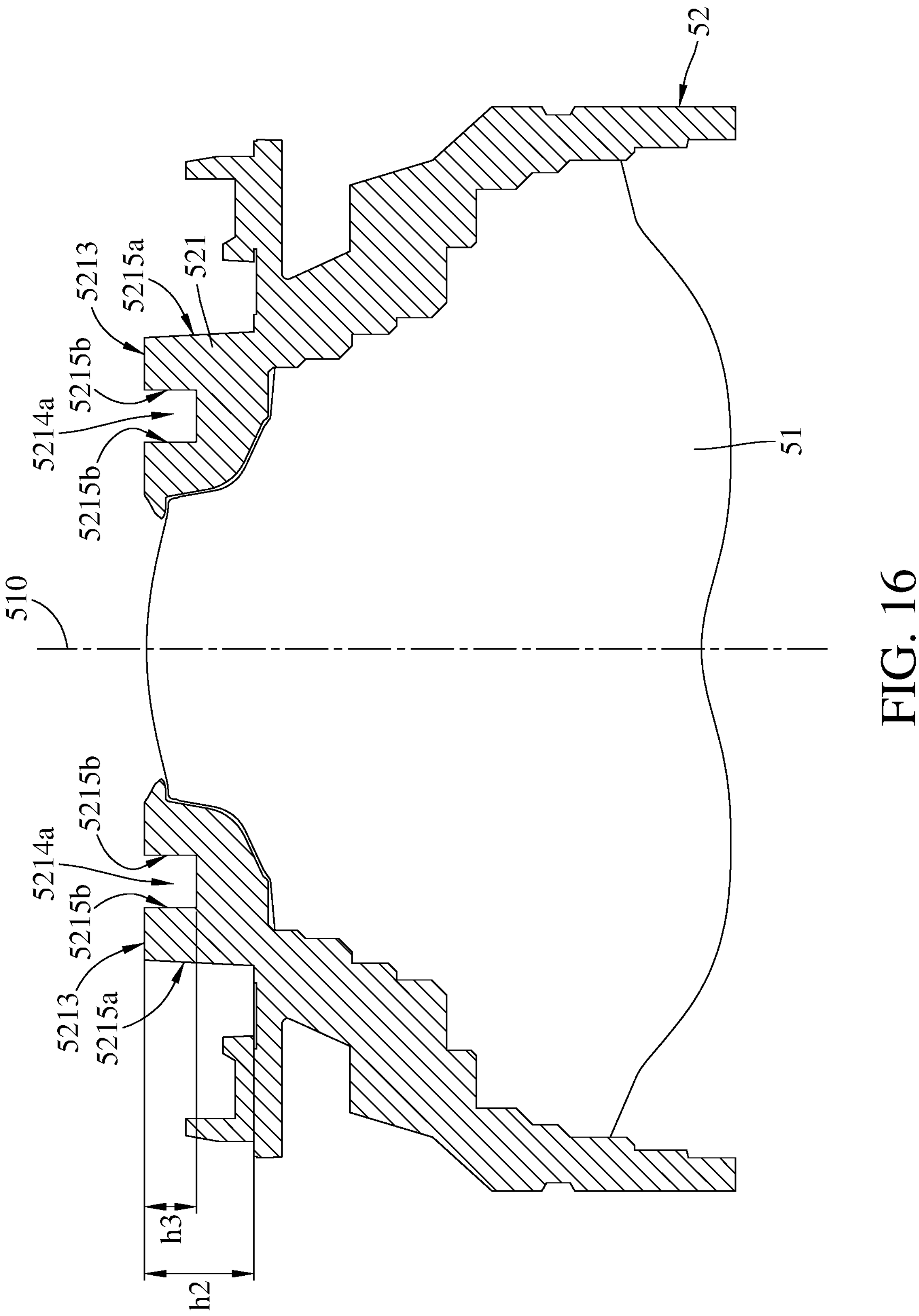
FIG. 16 is a cross-sectional view of the lens carrier in FIG. 15 with at least one lens element therein.

Please refer to FIG. 15 and FIG. 16, where FIG. 15 is a perspective view of a lens carrier of an imaging lens module according to the 5th embodiment of the present disclosure, and FIG. 16 is a cross-sectional view of the lens carrier in FIG. 15 with at least one lens element therein.

This embodiment provides an imaging lens module 5 which is similar with the imaging lens module 4 of the abovementioned 4th embodiment. Therefore, only differences between the imaging lens module 5 and the imaging lens module 4, as well as necessary descriptions, will be illustrated hereinafter.

Among the lens carrier 52, the object-side portion 521 further has a plurality of slots 5214*a* and a plurality of second lateral walls 5215*b*. The slots 5214*a* extend away from the topmost surface 5213 along a direction parallel to the optical axis 510 of the lens elements 51. The second lateral walls 5215*b* are located in the slots 5214*a* and are located closer to the optical axis 510 than the first lateral walls 5215*a*.

When a height of the first lateral walls 5215*a* along a direction parallel to the optical axis 510 is h2, and a height of the second lateral walls 5215*b* is h3, the following conditions are satisfied: h2=0.66 [mm]; h3=0.31 [mm]; and h3/h2=0.47.

6th Embodiment

Figure 17:
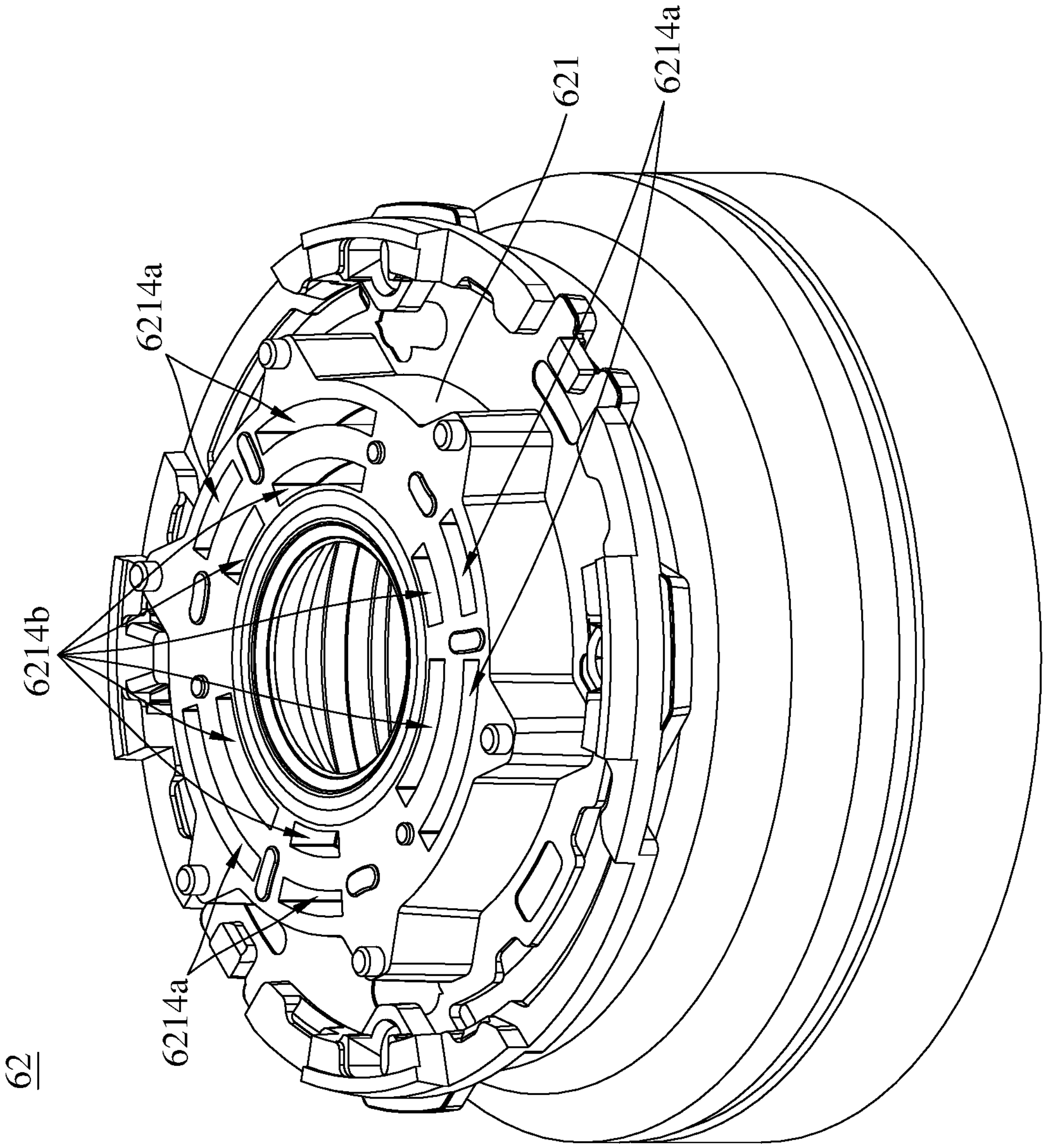
FIG. 17 is a perspective view of a lens carrier of an imaging lens module according to the 6th embodiment of the present disclosure.
Figure 18:
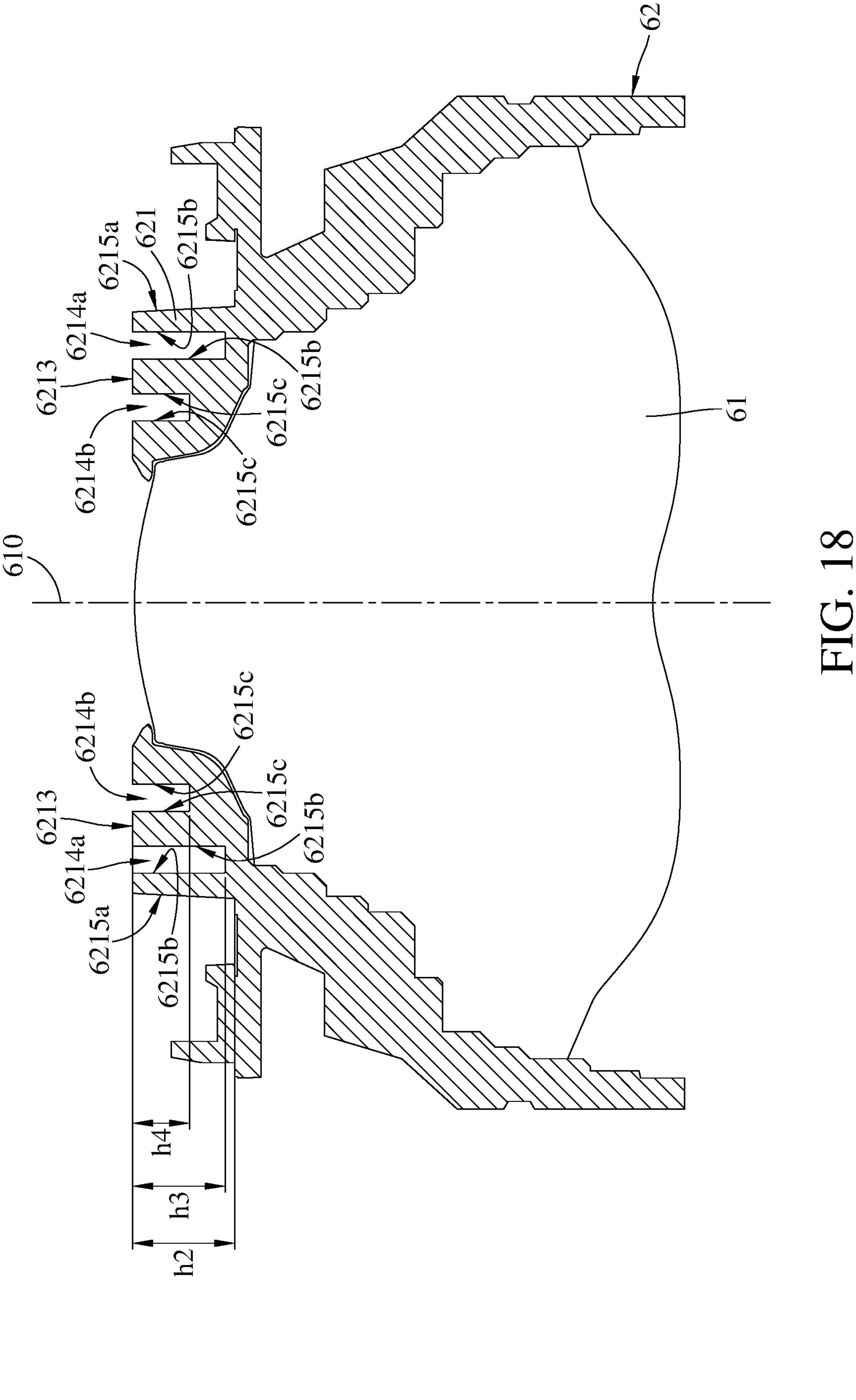
FIG. 18 is a cross-sectional view of the lens carrier in FIG. 17 with at least one lens element therein.

Please refer to FIG. 17 and FIG. 18, where FIG. 17 is a perspective view of a lens carrier of an imaging lens module according to the 6th embodiment of the present disclosure, and FIG. 18 is a cross-sectional view of the lens carrier in FIG. 17 with at least one lens element therein.

This embodiment provides an imaging lens module 6 which is similar with the imaging lens module 4 of the abovementioned 4th embodiment. Therefore, only differences between the imaging lens module 6 and the imaging lens module 4, as well as necessary descriptions, will be illustrated hereinafter.

Among the lens carrier 62, the object-side portion 621 further has a plurality of slots 6214*a* and 6214*b*, a plurality of second lateral walls 6215*b* and a plurality of third lateral walls 6215*c*. The slots 6214*b* are located closer to the optical axis 610 of the lens elements 61 than the slots 6214*a*. The slots 6214*a* and 6214*b* extend away from the topmost surface 6213 along a direction parallel to the optical axis 610. The second lateral walls 6215*b* are located in the slots 6214*a* and are located closer to the optical axis 610 than the first lateral walls 6215*a*. The third lateral walls 6215*c* are located in the slots 6214*b* and are located closer to the optical axis 610 than the second lateral walls 6215*b*.

When a height of the first lateral walls 6215*a* along a direction parallel to the optical axis 610 is h2, and a height of the second lateral walls 6215*b* is h3, the following conditions are satisfied: h2=0.66 [mm]; h3=0.59 [mm]; and h3/h2=0.89.

When the height of the second lateral walls 6215*b* is h3, and a height of the third lateral walls 6215*c* is h4, the following conditions are satisfied: h3=0.59 [mm]; h4=0.36 [mm]; and h4/h3=0.61.

7th Embodiment

Figure 19:
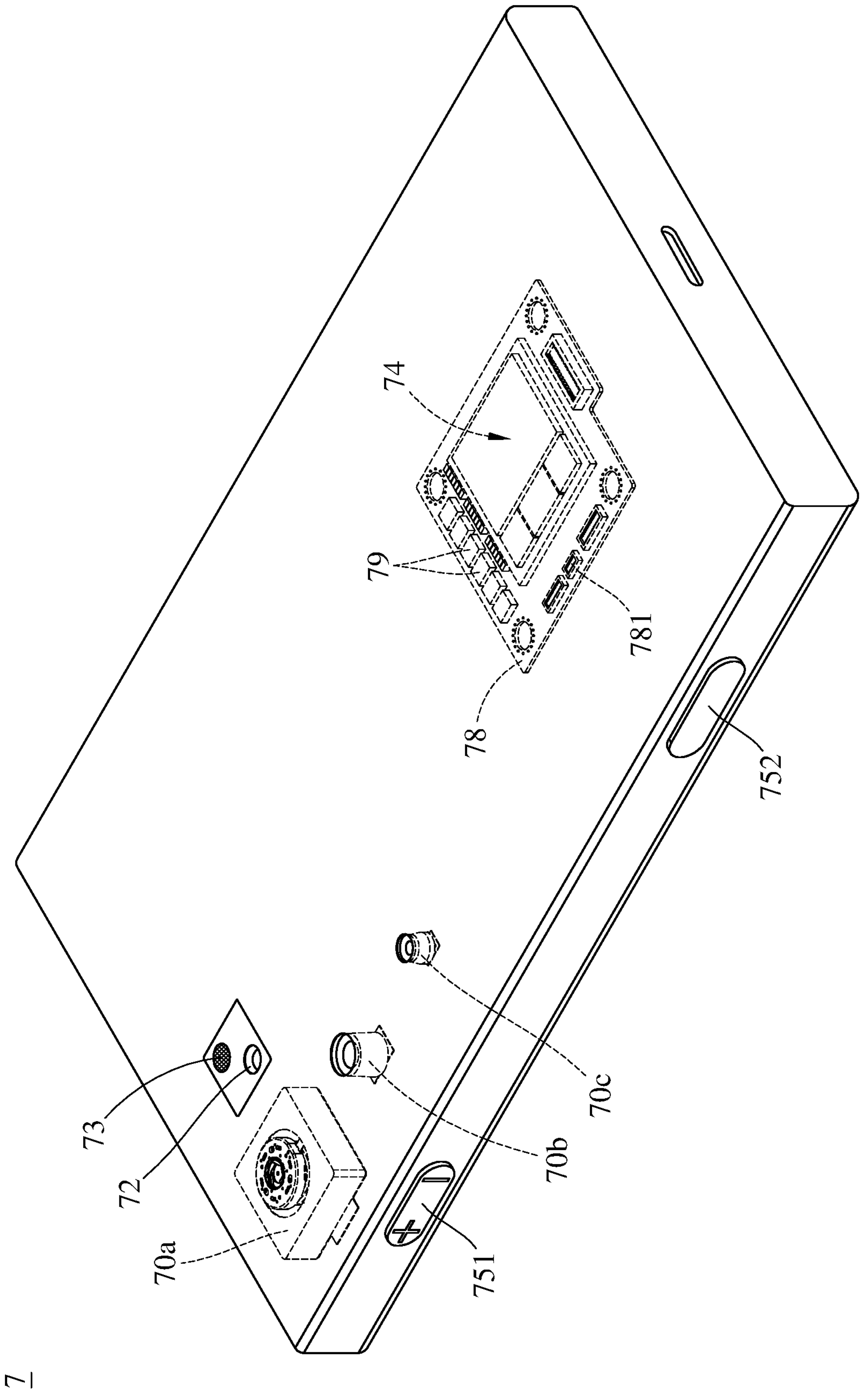
FIG. 19 is one perspective view of an electronic device according to the 7th embodiment of the present disclosure.
Figure 20:
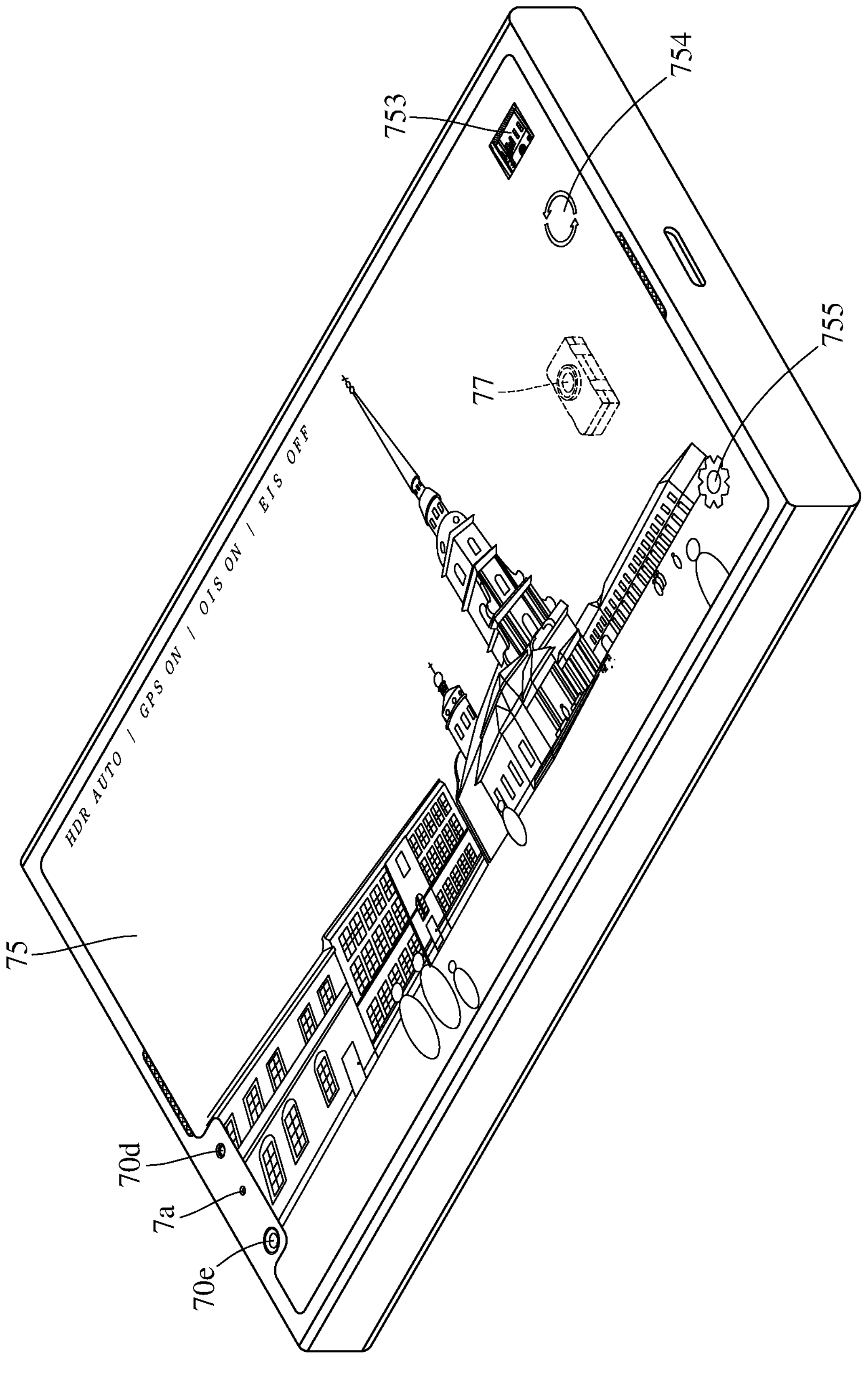
FIG. 20 is another perspective view of the electronic device in FIG. 19.
Figure 21:
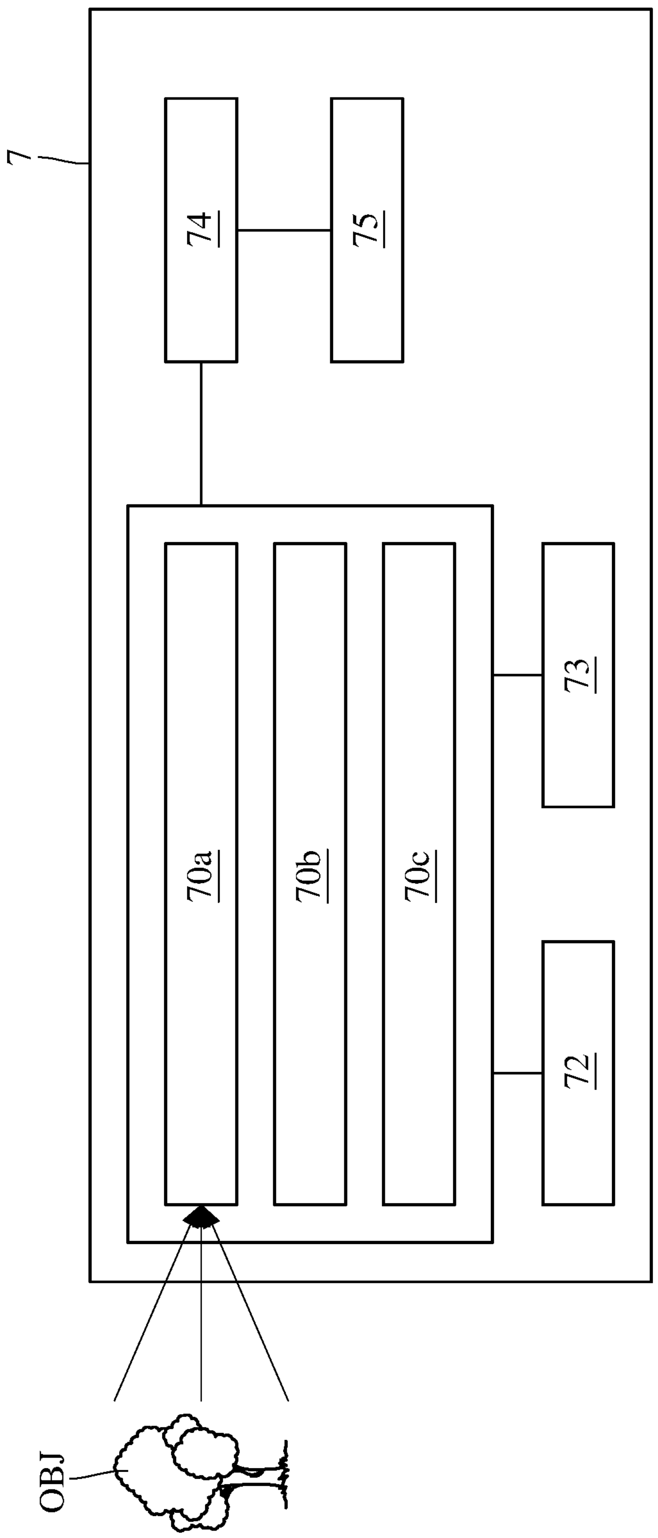
FIG. 21 is a block diagram of the electronic device in FIG. 19.

Please refer to FIG. 19 to FIG. 21, where FIG. 19 is one perspective view of an electronic device according to the 7th embodiment of the present disclosure, FIG. 20 is another perspective view of the electronic device in FIG. 19, and FIG. 21 is a block diagram of the electronic device in FIG. 19.

In this embodiment, an electronic device 7 is a mobile device such as a computer, a smartphone, a smart wearable device, a camera drone, or a driving recorder and displayer, and the present disclosure is not limited thereto. The electronic device 7 includes a camera module 70*a*, a wide-angle camera module 70*b*, a macro-photo camera module 70*c*, a compact camera module 70*d*, a ToF (time of flight) camera module 70*e*, a flash module 72, a focus assist module 73, an image signal processor (not numbered), a display module 75, an image software processor (not numbered) and a biometric identification device 77. In addition, the camera module 70*a* is, for example, the imaging lens module 1 as disclosed in the 1st embodiment, but the present disclosure is not limited thereto. Each of the camera modules 70*b*, 70*c*, 70*d* and 70*e* may be one of the imaging lens modules as disclosed in the above embodiments of the present disclosure.

The camera module 70*a*, the camera module 70*b* and the camera module 70*c* are disposed on the same side of the electronic device 7. The camera module 70*d*, the camera module 70*e* and the display module 75 are disposed on the opposite side of the electronic device 7. The display module 75 can be a user interface, such that the camera module 70*d* and the camera module 70*e* can be front-facing cameras of the electronic device 7 for taking selfies, but the present disclosure is not limited thereto.

Figure 22:
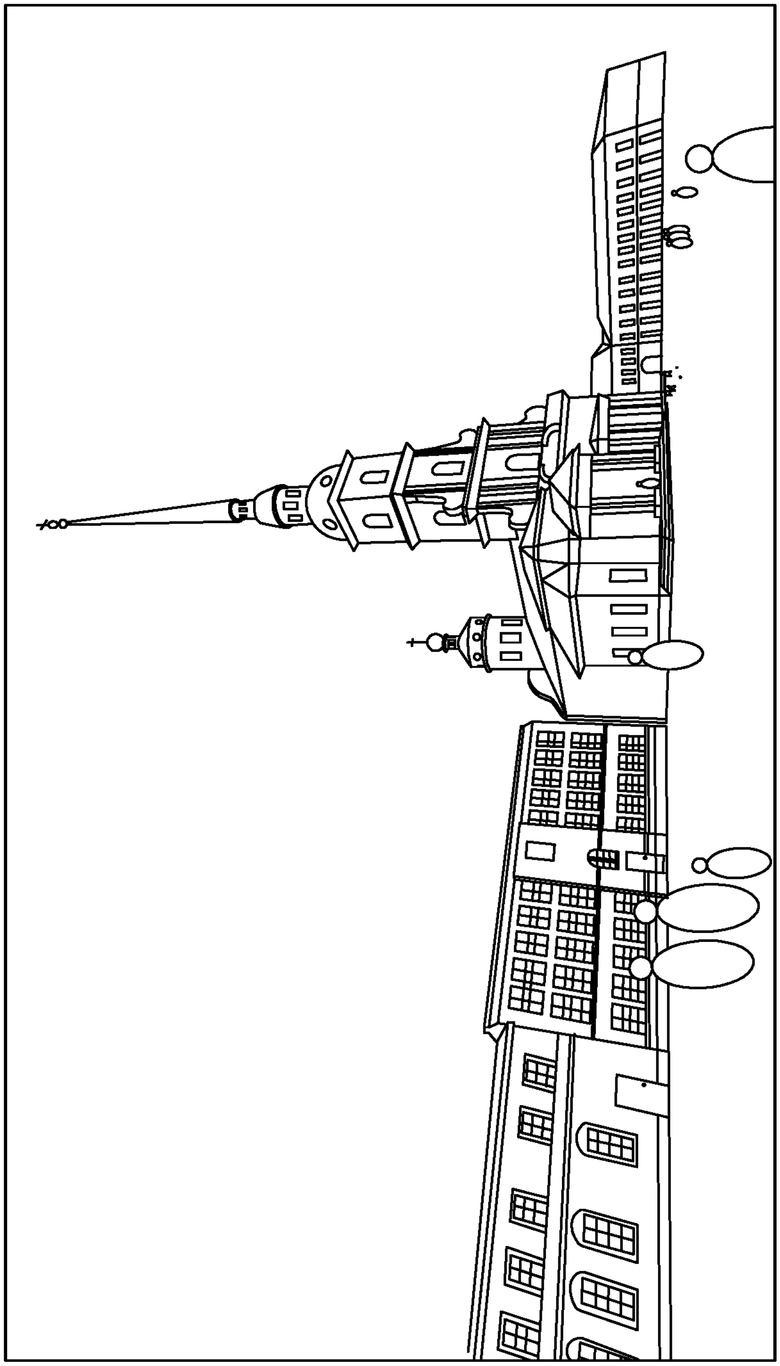
FIG. 22 shows an image captured by the electronic device using a wide-angle camera module in FIG. 19.
Figure 23:
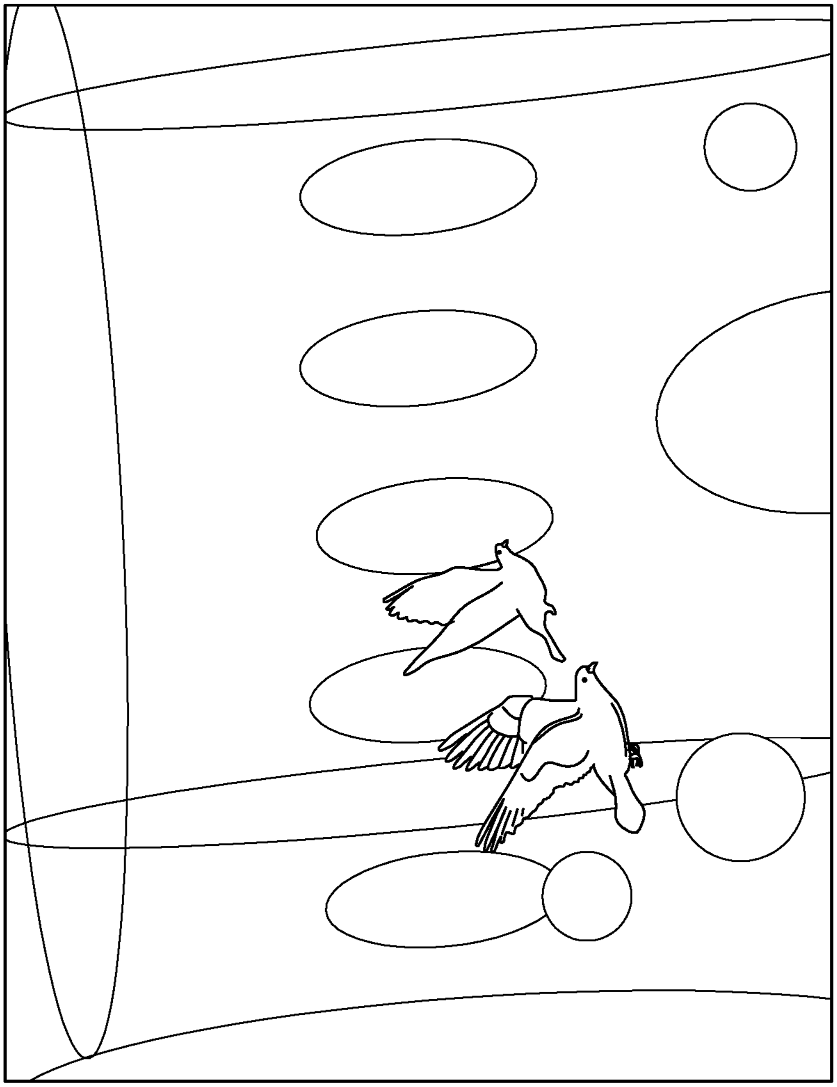
FIG. 23 shows an image captured by the electronic device using a camera module having a variable aperture stop in FIG. 19 with an f-number of 1.4.
Figure 24:
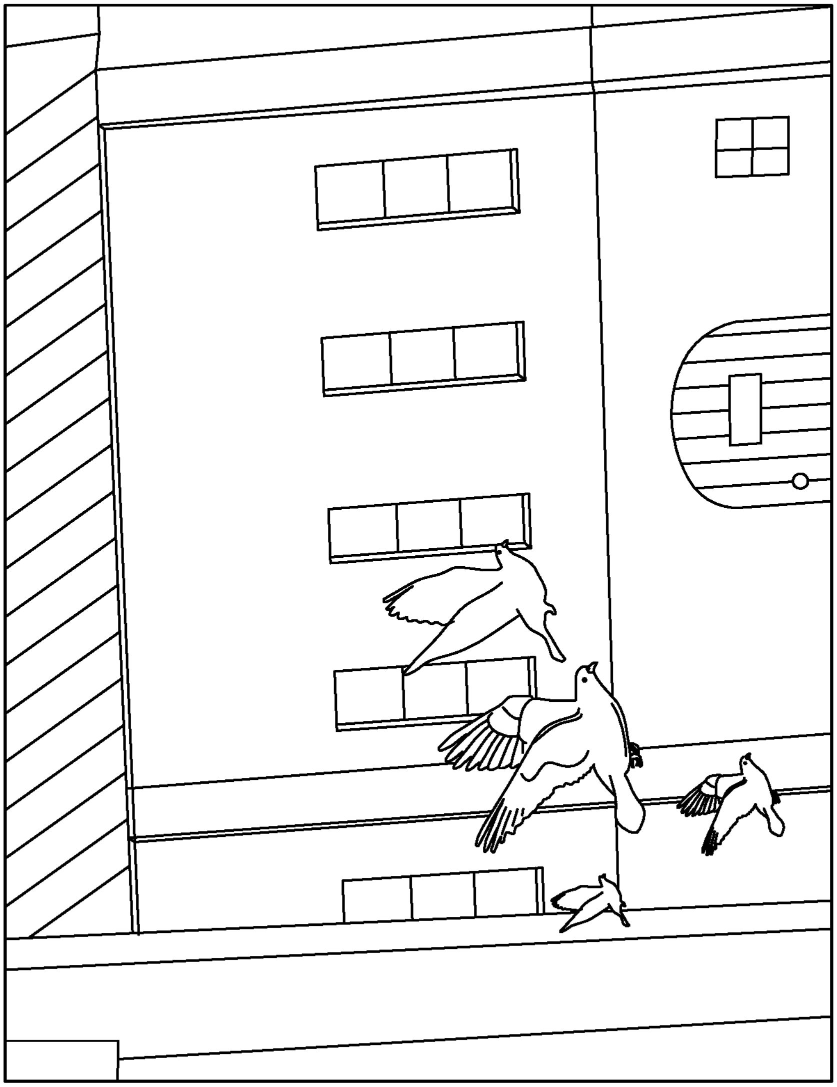
FIG. 24 shows an image captured by the electronic device using a camera module having a variable aperture stop in FIG. 19 with an f-number of 5.6.

In this embodiment, the camera module 70*a*, the camera module 70*b* and the camera module 70*c* have different fields of view, such that the electronic device 7 can have various magnification ratios so as to meet the requirement of optical zoom functionality. For example, the wide-angle camera module 70*b* has a relatively large field of view, and the image captured by the wide-angle camera module 70*b* can refer to FIG. 22, which shows an image captured by the electronic device 7 with a wide-angle camera module 70*b*, and the captured image as shown in FIG. 22 includes the whole cathedral, surrounding buildings and people in front of the cathedral. The captured image as shown in FIG. 22 has a relatively large field of view and depth of view, but it often has a relatively large degree of distortion. The image captured by the camera module 70*a* with a relatively small f-number can refer to FIG. 23, and the image captured by the camera module 70*a* with a relatively large f-number can refer to FIG. 24. FIG. 23 shows an image captured by the electronic device 7 with a camera module 70*a* with an f-number of 1.4, FIG. 24 shows an image captured by the electronic device 7 with a camera module 70*a* with an f-number of 5.6, and the captured images as shown in FIG. 23 and FIG. 24 include birds flying in front of the cathedral. As shown in FIG. 23, when the variable through hole assembly 13 of the camera module 70*a* provides a relatively large through hole TH, the image sensor receives more light, but the background in the image is relatively blurry. As shown in FIG. 24, when the variable through hole assembly 13 of the camera module 70*a* provides a relatively small through hole TH, the image sensor receives less light, but the background in the image is relatively clear. The captured images as shown in FIG. 23 and FIG. 24 have a relatively small field of view, and the camera module 70*a* can be used for shooting moving targets. For example, the auto-focus driving part can drive the lens carrier to quickly and continuously autofocus on the target, such that the captured image of the target would not be blurred due to deviation from the focusing position. When imaging, the camera module 70*a* can further perform optical zoom for imaged objects so as to obtain more remarkable images. In addition, the ToF camera module 70*e* can determine depth information of the imaged object. In this embodiment, the electronic device 7 includes multiple camera modules 70*a*, 70*b*, 70*c*, 70*d*, and 70*e*, but the present disclosure is not limited to the number and arrangement of camera modules.

When a user captures images of an object OBJ, light rays converge in the camera module 70*a*, the camera module 70*b* or the camera module 70*c* to generate images, and the flash module 72 is activated for light supplement. The focus assist module 73 detects the object distance of the imaged object OBJ to achieve fast auto focusing. The image signal processor is configured to optimize the captured image to improve image quality. The light beam emitted from the focus assist module 73 can be either conventional infrared or laser.

In addition, the light rays may converge in the camera module 70*d* or the camera module 70*e* to generate images. The electronic device 7 can include a reminder light 7*a* that can be illuminated to remind the user that the camera module 70*d* or the camera module 70*e* is working. The display module 75 can be a touch screen or collaborated with physical buttons such as a zoom button 751 and a shutter release button 752. The user is able to interact with the display module 75 and the image software processor having multiple functions to capture images and complete image processing. The image processed by the image software processor can be displayed on the display module 75. The user can replay the previously captured image through an image playback button 753 of the display module 75, can choose a suitable camera module for shooting through a camera module switching button 754 of the display module 75, and can properly adjust shooting parameters according to current shooting situations through an integrated menu button 755 of the display module 75.

Further, the electronic device 7 further includes a circuit board 78 and a plurality of electronic components 79 disposed on the circuit board 78. The camera modules 70*a*, 70*b*, 70*c*, 70*d*, and 70*e* are electrically connected to the electronic component 79 via connectors 781 on the circuit board 78. The electronic components 79 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 79 can also include a storage unit, a random access memory for storing image information, a gyroscope, and a position locator for facilitating the navigation or positioning of the electronic device 7. In this embodiment, the image signal processor, the image software processor and the random access memory are integrated into a single chip system 74, but the present disclosure is not limited thereto. In some other embodiments, the electronic components can also be integrated in the camera module or can also be disposed on one of the circuit boards. In addition, the user can use the biometric identification device 77 to turn on or unlock the electronic device 7.

The smartphone in this embodiment is only exemplary for showing the imaging lens module of the present disclosure installed in the electronic device 7, and the present disclosure is not limited thereto. The imaging lens module can be optionally applied to optical systems with a movable focus. Furthermore, the imaging lens modules 1-6 feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, comprising:

at least one lens element, having an optical axis;

a lens carrier, accommodating the at least one lens element, the lens carrier comprising:

an object-side portion, having:

an object-side opening configured for light entering the imaging lens module, wherein the object-side portion forms a minimum opening of the lens carrier at the object-side opening;

a guiding structure, located further away from the optical axis than the minimum opening;

a topmost surface, being a surface of the object-side portion closest to an object side;

at least one slot, extending away from the topmost surface along a direction parallel to the optical axis;

a first lateral wall, located closer to the optical axis than the guiding structure; and a second lateral wall, located in the at least one slot, wherein the second lateral wall is located closer to the optical axis than the first lateral wall;

an image-side portion, opposite to the object-side portion; and a tubular portion, connected to and located between the object-side portion and the image-side portion; and a variable through hole assembly, disposed on the object-side portion, the variable through hole assembly comprising:

a plurality of rotatable blades, rotatably disposed about the optical axis, wherein the guiding structure guides movement of the plurality of rotatable blades, the plurality of rotatable blades are configured to form a through hole, and a size of the through hole is variable; and a blade driving part, comprising:

a rotatable member, connected to the plurality of rotatable blades, wherein the rotatable member drives the plurality of rotatable blades to vary the size of the through hole;

at least two rolling members, disposed between the guiding structure and the rotatable member along a direction parallel to the optical axis so as to support rotation motion of the rotatable member, wherein the at least two rolling members are located further away from the optical axis than the first lateral wall;

at least one driving magnet; and at least one driving coil, wherein the at least one driving magnet and the at least one driving coil are disposed opposite to each other along a direction parallel to the optical axis;

wherein the object-side portion and the image-side portion form an air sleeve therebetween, and the air sleeve is located further away from the optical axis than the tubular portion;

wherein the rotatable member is located between the plurality of rotatable blades and the guiding structure of the object-side portion;

wherein each of the at least two rolling members has a rolling center, a distance between the rolling center and the topmost surface along a direction parallel to the optical axis is h1, a height of the first lateral wall along a direction parallel to the optical axis is h2, and the following condition is satisfied:

$$1 \leq h2/h1 \leq 2.95.$$

2. The imaging lens module according to claim 1, wherein a maximum outer diameter of the object-side portion along a direction perpendicular to the optical axis is Do, a maximum outer diameter of the image-side portion along the direction perpendicular to the optical axis is Di, and the following condition is satisfied:

$$0.9 \leq Do/Di \leq 2.5.$$

3. The imaging lens module according to claim 2, wherein a maximum outer diameter of the tubular portion along the direction perpendicular to the optical axis is Dt, and the following condition is satisfied:

$$4\ [\text{mm}] \leq Dt < Di < Do \leq 30\ [\text{mm}].$$

4. The imaging lens module according to claim 1, further comprising an auto-focus driving part, the auto-focus driving part comprising:

at least one auto-focus magnet; and at least one auto-focus coil, disposed opposite to the at least one auto-focus magnet;

wherein one of the at least one auto-focus magnet and the at least one auto-focus coil is disposed in the air sleeve, and the auto-focus driving part drives the lens carrier to move along a direction parallel to the optical axis.

5. The imaging lens module according to claim 1, further comprising an auto-focus driving part, the auto-focus driving part comprising:

at least one auto-focus magnet; and at least one auto-focus coil, disposed opposite to the at least one auto-focus magnet;

wherein the image-side portion has a recess, one of the at least one auto-focus magnet and the at least one auto-focus coil is disposed in the recess, and the auto-focus driving part drives the lens carrier to move along a direction parallel to the optical axis.

6. The imaging lens module according to claim 1, wherein a height of the second lateral wall is h3, and the following condition is satisfied:

$$0 < h3/h2 \leq 1.$$

7. The imaging lens module according to claim 6, wherein the object-side portion further has:

a third lateral wall, located in the at least one slot, wherein the third lateral wall is located closer to the optical axis than the second lateral wall.

8. The imaging lens module according to claim 7, wherein a height of the third lateral wall is h4, and the following condition is satisfied:

$$0 < h4/h3 \leq 1.$$

9. The imaging lens module according to claim 1, wherein the air sleeve has:

an upper surface, being a surface of the air sleeve closest to an object side along a direction parallel to the optical axis; and a lower surface, being a surface of the air sleeve closest to an image side along the direction parallel to the optical axis;

wherein a distance between the upper surface and the lower surface along the direction parallel to the optical axis is Ha, a height of the lens carrier is Hb, and the following condition is satisfied:

$$0.005 \leq Ha/Hb \leq 0.9.$$

10. The imaging lens module according to claim 1, wherein an f-number of the imaging lens module is FNO, and the following condition is satisfied:

$$1.4 \leq FNO \leq 4.0.$$

11. The imaging lens module according to claim 1, wherein a maximum field of view of the imaging lens module is FOV, and the following condition is satisfied:

$$50\ [\text{deg.}] \leq FOV \leq 105\ [\text{deg.}].$$

12. An electronic device, comprising:
the imaging lens module of claim 1.

13. An imaging lens module, comprising:
at least one lens element, having an optical axis;
a lens carrier, accommodating the at least one lens element, the lens carrier comprising:
an object-side portion, having:
an object-side opening configured for light entering the imaging lens module, wherein the object-side portion forms a minimum opening of the lens carrier at the object-side opening;
a guiding structure, located further away from the optical axis than the minimum opening;
a topmost surface, being a surface of the object-side portion closest to an object side;
at least one slot, extending away from the topmost surface along a direction parallel to the optical axis;
a first lateral wall, located closer to the optical axis than the guiding structure; and
a second lateral wall, located in the at least one slot, wherein the second lateral wall is located closer to the optical axis than the first lateral wall;
an image-side portion, opposite to the object-side portion; and
a tubular portion, connected to and located between the object-side portion and the image-side portion; and
a variable through hole assembly, disposed on the object-side portion, the variable through hole assembly comprising:
a plurality of rotatable blades, rotatably disposed about the optical axis, wherein the guiding structure guides movement of the plurality of rotatable blades, the plurality of rotatable blades are configured to form a through hole, and a size of the through hole is variable; and
a blade driving part, comprising:
a rotatable member, connected to the plurality of rotatable blades, wherein the rotatable member drives the plurality of rotatable blades to vary the size of the through hole;
at least two rolling members, disposed between the guiding structure and the rotatable member along a direction parallel to the optical axis so as to support rotation motion of the rotatable member, wherein the at least two rolling members are located further away from the optical axis than the first lateral wall;
at least one driving magnet; and
at least one driving coil, wherein the at least one driving magnet and the at least one driving coil are disposed opposite to each other along a direction parallel to the optical axis;
wherein each of the at least two rolling members has a rolling center, a distance between the rolling center and the topmost surface along a direction parallel to the optical axis is h1, a height of the first lateral wall along a direction parallel to the optical axis is h2, and the following condition is satisfied:

$$1 \leq h2/h1 \leq 2.95.$$

14. The imaging lens module according to claim 13, wherein a maximum outer diameter of the object-side portion along a direction perpendicular to the optical axis is Do, a maximum outer diameter of the image-side portion along the direction perpendicular to the optical axis is Di, and the following condition is satisfied:

$$0.9 \leq Do/Di \leq 2.5.$$

15. The imaging lens module according to claim 14, wherein a maximum outer diameter of the tubular portion along the direction perpendicular to the optical axis is Dt, and the following condition is satisfied:

$$4\ [\text{mm}] \leq Dt < Di < Do \leq 30\ [\text{mm}].$$

16. The imaging lens module according to claim 13, wherein a height of the second lateral wall is h3, and the following condition is satisfied:

$$0 < h3/h2 \leq 1.$$

17. The imaging lens module according to claim 13, further comprising an auto-focus driving part, the auto-focus driving part comprising:
at least one auto-focus magnet; and
at least one auto-focus coil, disposed opposite to the at least one auto-focus magnet;
wherein the image-side portion has a recess, one of the at least one auto-focus magnet and the at least one auto-focus coil is disposed in the recess, and the auto-focus driving part drives the lens carrier to move along a direction parallel to the optical axis.

18. The imaging lens module according to claim 13, wherein an f-number of the imaging lens module is FNO, and the following condition is satisfied:

$$1.4 \leq FNO \leq 4.0.$$

19. The imaging lens module according to claim 13, wherein a maximum field of view of the imaging lens module is FOV, and the following condition is satisfied:

$$50\ [\text{deg.}] \leq FOV \leq 105\ [\text{deg.}].$$

20. An electronic device, comprising:
the imaging lens module of claim 13.

* * * * *